(12) United States Patent
Itou et al.

(10) Patent No.: US 11,264,627 B2
(45) Date of Patent: Mar. 1, 2022

(54) FUEL CELL SYSTEM

(71) Applicant: TOYOTA JIDOSHA KABUSHIKI KAISHA, Toyota (JP)

(72) Inventors: Masayuki Itou, Sunto-gun (JP); Yasushi Araki, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/901,489

(22) Filed: Jun. 15, 2020

(65) Prior Publication Data
US 2020/0403257 A1 Dec. 24, 2020

(30) Foreign Application Priority Data
Jun. 18, 2019 (JP) .............................. JP2019-113178

(51) Int. Cl.
| | |
|---|---|
| *H01M 8/04302* | (2016.01) |
| *H01M 8/04664* | (2016.01) |
| *H01M 8/04537* | (2016.01) |
| *H01M 8/249* | (2016.01) |
| *H01M 8/04955* | (2016.01) |
| *H01M 8/04858* | (2016.01) |
| *H01M 8/0432* | (2016.01) |
| *H01M 8/04303* | (2016.01) |
| *H01M 8/10* | (2016.01) |

(52) U.S. Cl.
CPC ..... *H01M 8/04679* (2013.01); *H01M 8/0494* (2013.01); *H01M 8/04302* (2016.02); *H01M 8/04303* (2016.02); *H01M 8/04365* (2013.01); *H01M 8/04552* (2013.01); *H01M 8/04559* (2013.01); *H01M 8/04671* (2013.01); *H01M 8/04955* (2013.01); *H01M 8/249* (2013.01); *H01M 2008/1095* (2013.01); *H01M 2250/20* (2013.01)

(58) Field of Classification Search
CPC ......... H01M 8/04302; H01M 8/04679; H01M 8/04303; H01M 8/04365
See application file for complete search history.

(56) References Cited

FOREIGN PATENT DOCUMENTS

| | | |
|---|---|---|
| JP | 2004-039524 | 2/2004 |
| JP | 2004-171880 | 6/2004 |
| JP | 2004-171890 | 6/2004 |
| JP | 2006-012550 | 1/2006 |

(Continued)

*Primary Examiner* — Olatunji A Godo
(74) *Attorney, Agent, or Firm* — Finnegan, Henderson, Farabow, Garrett & Dunner, LLP

(57) ABSTRACT

A fuel cell system includes a first fuel cell having first unit cells stacked together, a second fuel cell having second unit cells stacked together, a first voltage detector, a second voltage detector, and a controller. The first voltage detector detects voltage of the first unit cells for every "N" unit cells on average, and the second voltage detector detects voltage of the whole second fuel cell, or detects voltage of the second unit cells for every "M" unit cells on average. The controller determines whether any of the first unit cells is in a fuel deficiency state, by referring to a detection result of the first voltage detector, and performs a cancellation process to cancel the fuel deficiency state, on the first fuel cell that is in a power generating state, while stopping power generation of the second fuel cell, when an affirmative decision is obtained.

11 Claims, 8 Drawing Sheets

(56) References Cited

FOREIGN PATENT DOCUMENTS

| JP | 2006-049134 | 2/2006 |
| JP | 2006-049259 | 2/2006 |
| JP | 2006-302746 | 11/2006 |
| JP | 2007-180048 | 7/2007 |
| JP | 2010238567 | * 10/2010 |
| JP | 2015-153563 | 8/2015 |

* cited by examiner

FUEL CELL SYSTEM

INCORPORATION BY REFERENCE

The disclosure of Japanese Patent Application No. 2019-113178 filed on Jun. 18, 2019 including the specification, drawings and abstract is incorporated herein by reference in its entirety.

BACKGROUND

1. Technical Field

The disclosure relates to a fuel cell system.

2. Description of Related Art

In a fuel cell having a plurality of unit cells stacked together, when fuel gas is not sufficiently supplied to a part of the unit cells, and each unit cell in this part is placed in a fuel deficiency state, the voltage of the unit cell may be reduced down to a negative voltage, and the output performance of the unit cell may deteriorate (see, for example, Japanese Unexamined Patent Application Publication No. 2006-049259 (JP 2006-049259 A)).

SUMMARY

In order to curb deterioration of the output performance, it may be considered to determine whether any of the unit cells is in a fuel deficiency state, and perform a cancellation process for cancelling the fuel deficiency state when one or more unit cells are in the fuel deficiency state. Here, it can be determined, with high accuracy, whether any of the unit cells is in the fuel deficiency state, by referring to a detection result of a voltage detector that detects voltage of the unit cells for each unit cell, for example. As a result, the cancellation process can be appropriately performed, and deterioration of the output performance can be curbed.

The manufacturing cost of the voltage detector is higher as it detects voltage of unit cells for each set of a smaller number of unit cells, and the manufacturing cost is higher when the voltage of the unit cells is detected for each unit cell, as compared with the case where the voltage is detected for every two or more unit cells, or only the voltage of the whole fuel cell is detected. Also, in the fuel cell system having a plurality of fuel cells, if a voltage detector having a high manufacturing cost is connected to each of the fuel cells, the manufacturing cost of the fuel cell system will be increased.

This disclosure provides a fuel cell system that curbs deterioration of the output performance while reducing the manufacturing cost.

A fuel cell system is provided according to one aspect of the disclosure. The fuel cell system includes a first fuel cell to which a fuel gas and an oxidant gas are supplied, and which includes a plurality of first unit cells stacked together, a second fuel cell to which a fuel gas and an oxidant gas are supplied, and which includes a plurality of second unit cells stacked together, a first voltage detector connected to the first fuel cell, a second voltage detector connected to the second fuel cell, and a controller configured to control operation of the first fuel cell and the second fuel cell. The first voltage detector is configured to detect voltage of the first unit cells for every "N" unit cells on average, and the second voltage detector is configured to detect voltage of the second fuel cell as a whole, or detect voltage of the second unit cells for every "M" unit cells on average, where "M" represents a number that is larger than "N". The controller is configured to perform a determining process to determine whether any of the first unit cells is in a fuel deficiency state, by referring to a detection result of the first voltage detector. The controller is configured to perform a cancellation process to cancel the fuel deficiency state, on the first fuel cell that is in a power generating state, and control power generation of the second fuel cell to a stopped state, when an affirmative decision is obtained in the determining process.

In the fuel cell system as described above, the controller may be configured to continue the cancellation process that is being performed on the first fuel cell, while referring to the detection result of the first voltage detector.

In the fuel cell system as described above, the controller may be configured to determine whether the fuel deficiency state has been cancelled in all of the first unit cells through execution of the cancellation process, by referring to the detection result of the first voltage detector.

In the fuel cell system as described above, the controller may be configured to stop the cancellation process, when the controller determines that the fuel deficiency state has been cancelled in all of the first unit cells through execution of the cancellation process.

In the fuel cell system as described above, the controller may be configured to control power generation of the first fuel cell to the stopped state, when the controller does not determine that the fuel deficiency state has been cancelled in all of the first unit cells through execution of the cancellation process.

In the fuel cell system as described above, the controller may be configured to, when the controller determines that any of the first unit cells is in the fuel deficiency state, perform the cancellation process on the first fuel cell, control power generation of the second fuel cell to the stopped state, and further perform an advance process to cancel a cause of the fuel deficiency state, on the second fuel cell, before start of power generation of the second fuel cell.

In the fuel cell system as described above, the controller may be configured to, when the controller determines that any of the first unit cells is in the fuel deficiency state, and a voltage parameter correlated with the voltage of the second fuel cell indicates that the voltage of the second fuel cell that is in the power generating state is lower than a threshold value, perform the cancellation process on the first fuel cell, and control power generation of the second fuel cell to the stopped state.

In the fuel cell system as described above, the controller may be configured to, when the controller determines that any of the first unit cells is in the fuel deficiency state, and a temperature parameter correlated with a temperature of the second fuel cell indicates that the temperature of the second fuel cell that is in the power generating state is equal to or lower than a threshold value, perform the cancellation process on the first fuel cell, and control power generation of the second fuel cell to the stopped state.

In the fuel cell system as described above, the controller may be configured to, when a request for start of power generation is generated to at least one of the first fuel cell and the second fuel cell, perform the determining process on the first fuel cell that is in the power generating state.

In the fuel cell system as described above, the controller may be configured to, when a request for start of power generation is generated to at least one of the first fuel cell and the second fuel cell, and an outside air temperature parameter correlated with an outside air temperature indicates that the outside air temperature is equal to or lower than a threshold value, perform the determining process on the first fuel cell that is in the power generating state.

In the fuel cell system as described above, the controller may be configured to, when the controller determines that any of the first unit cells is in the fuel deficiency state, and a total required output of the first fuel cell and the second fuel cell is smaller than a threshold value, perform the cancellation process on the first fuel cell, and control power generation of the second fuel cell to the stopped state.

The disclosure provides the fuel cell system that curbs reduction of the output performance, while reducing the manufacturing cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

General Configuration of Fuel Cell System

Figure 1:
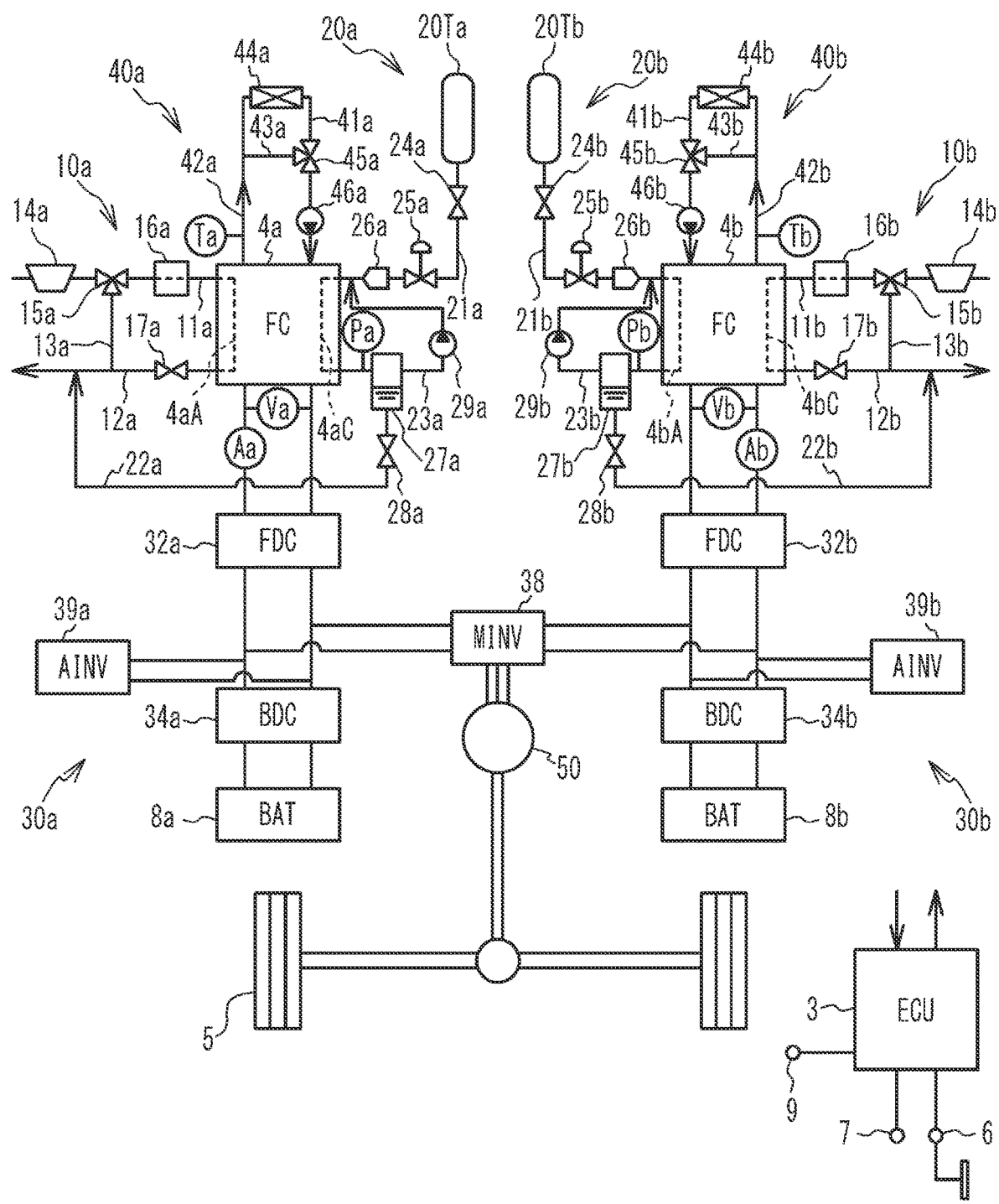
FIG. 1 is a view showing the configuration of a fuel cell system installed on a vehicle.

FIG. 1 shows the configuration of a fuel cell system 1 installed on a vehicle. The fuel cell system 1 includes an electronic control unit (ECU) 3 (controller), fuel cell (which will be referred to as "FC") 4a (first fuel cell), fuel cell 4b (second fuel cell), secondary batteries (each of which will be referred to as "BAT") 8a, 8b, oxidant gas supply systems 10a, 10b, fuel gas supply systems 20a, 20b, power control systems 30a, 30b, and cooling systems 40a, 40b. Also, the vehicle includes a motor 50 for propelling the vehicle, wheels 5, accelerator pedal position sensor 6, ignition switch 7, and outside air temperature sensor 9.

The FCs 4a, 4b are fuel cells that generate electric power when they are supplied with fuel gas and oxidant gas. Each of the FCs 4a, 4b is in the form of a stack of a plurality of unit cells of solid polymer electrolyte type. A cathode channel 4aC, 4bC through which the oxidant gas flows, and an anode channel 4aA, 4bA through which the fuel gas flows, are formed in each of the FCs 4a, 4b. The unit cell, which includes a membrane-electrode assembly and a pair of separators that sandwich the assembly, is the minimum unit of the fuel cell. The anode channel 4aA includes an anode inlet manifold and an anode outlet manifold, which extend through the separators of the unit cells, and space provided in each unit cell, between one of the separators located on the anode side of the membrane-electrode assembly, and the membrane-electrode assembly. The membrane-electrode assembly includes an electrolyte membrane, and catalyst layers formed on opposite surfaces of the electrolyte membrane. The cathode channel 4aC includes a cathode inlet manifold and a cathode outlet manifold, which extend through the separators of the unit cells, and space provided in each unit cell, between the other separator located on the cathode side of the membrane-electrode assembly, and the membrane-electrode assembly. In this embodiment, the FCs 4a and 4b are identical with each other, but are not limited to the same fuel cells. The FC 4a and the FC 4b are examples of the first fuel cell and the second fuel cell, respectively.

The oxidant gas supply systems 10a, 10b supply air including oxygen as oxidant gas, to the FCs 4a, 4b, respectively. More specifically, each of the oxidant gas supply systems 10a, 10b includes a supply pipe 11a, 11b, discharge pipe 12a, 12b, bypass pipe 13a, 13b, air compressor 14a, 14b, bypass valve 15a, 15b, intercooler 16a, 16b, and back pressure valve 17a, 17b.

The supply pipe 11a, 11b is connected to the cathode inlet manifold of the corresponding FC 4a, 4b. The discharge pipe 12a, 12b is connected to the cathode outlet manifold of the corresponding FC 4a, 4b. The bypass pipe 13a communicates with the supply pipe 11a and the discharge pipe 12a, and, similarly, the bypass pipe 13b communicates with the supply pipe 11b and the discharge pipe 12b. The bypass valve 15a is provided in a connecting portion of the supply pipe 11a and the bypass pipe 13a, and, similarly, the bypass valve 15b is provided in a connecting portion of the supply pipe 11b and the bypass pipe 13b. The bypass valve 15a switches a state of communication between the supply pipe 11a and the bypass pipe 13a, and, similarly, the bypass valve 15b switches a state of communication between the supply pipe 11b and the bypass pipe 13b. The air compressor 14a, bypass valve 15a, and intercooler 16a are arranged in this order from the upstream side on the supply pipe 11a. A back pressure valve 17a is provided on the discharge pipe 12a, and located upstream of a connecting portion of the discharge pipe 12a and the bypass pipe 13a. Similarly, the air compressor 14b, bypass valve 15b, and intercooler 16b are arranged in this order from the upstream side on the supply pipe 11b. A back pressure valve 17b is provided on the discharge pipe 12b, and located upstream of a connecting portion of the discharge pipe 12b and the bypass pipe 13b.

The air compressors 14a, 14b supply air including oxygen as oxidant gas, to the FCs 4a, 4b, via the supply pipes 11a, 11b, respectively. The oxidant gas supplied to the FCs 4a, 4b chemically reacts with fuel gas in the FCs 4a, 4b, to generate electricity, and is then discharged via the discharge pipes 12a, 12b, respectively. The intercoolers 16a, 16b cool the oxidant gas supplied to the FCs 4a, 4b, respectively. The back pressure valves 17a, 17b adjust the cathode-side back pressures of the FCs 4a, 4b, respectively.

The fuel gas supply systems 20a, 20b supply hydrogen gas as fuel gas to the FCs 4a, 4b, respectively. More specifically, each of the fuel gas supply systems 20a, 20b includes a tank 20Ta, 20Tb, supply pipe 21a, 21b, discharge pipe 22a, 22b, pressure sensor Pa, Pb, circulation pipe 23a, 23b, tank valve 24a, 24b, pressure regulating valve 25a, 25b, injector (which will be referred to as "INJ") 26a, 26b, gas-liquid separator 27a, 27b, drain valve 28a, 28b, and hydrogen circulation pump (which will be referred to as "HP") 29a, 29b, respectively.

The tank 20Ta and the anode inlet manifold of the FC 4a are connected by the supply pipe 21a. Similarly, the tank 20Tb and the anode inlet manifold of the FC 4b are connected by the supply pipe 21b. Hydrogen gas as the fuel gas is stored in the tanks 20Ta, 20Tb. Each of the discharge pipes 22a, 22b is connected at one end to the anode outlet manifold of the corresponding FC 4a, 4b, and is connected at the other end to the discharge pipe 12a, 12b of the corresponding oxidant gas supply system 10a, 10b. The circulation pipes 23a, 23b communicate with the gas-liquid separators 27a, 27b and the supply pipes 21a, 21b, respectively. The tank valve 24a, pressure regulating valve 25a, and INJ 26a are arranged in this order from the upstream side of the supply pipe 21a. In a condition where the tank valve 24a is open, the opening of the pressure regulating valve 25a is adjusted, and the fuel gas is injected from the INJ 26a. As a result, the fuel gas is supplied to the FC 4a. The tank valve 24a, pressure regulating valve 25a, and INJ 26a are driven, under control of the ECU 3. The tank valve 24b, pressure regulating valve 25b, and INJ 26b are located similarly, and operate in the same manner.

On the discharge pipe 22a, the pressure sensor Pa, gas-liquid separator 27a, and drain valve 28a are arranged in this order from the upstream side thereof. The pressure sensor Pa is provided in the vicinity of the anode outlet manifold of the FC 4a, and detects the pressure at the outlet side of the anode channel of the FC 4a. The gas-liquid separator 27a separates water from the fuel gas discharged from the FC 4a, and stores the water. When the drain valve 28a is opened, the water stored in the gas-liquid separator 27a is discharged to the outside of the fuel cell system 1, via the discharge pipes 22a, 12a. The drain valve 28a is driven under control of the ECU 3. Similarly, the pressure sensor Pb is provided in the vicinity of the anode outlet manifold of the FC 4b, and detects the pressure at the outlet side of the anode channel of the FC 4b. The gas-liquid separator 27b and the drain valve 28b are located and operate similarly to the gas-liquid separator 27a and the drain valve 28a, respectively.

The circulation pipe 23a permits the fuel gas to be circulated into the FC 4a, and its upstream end portion is connected to the gas-liquid separator 27a, while the HP 29a is located on the circulation pipe 23a. The fuel gas discharged from the FC 4a is adequately pressurized by the HP 29a, and fed to the supply pipe 21a. The HP 29a is driven under control of the ECU 3. The circulation pipe 23b and the HP 29b are located and operate similarly to the circulation pipe 23a and the HP 29a, respectively.

The cooling systems 40a, 40b cool the FCs 4a, 4b, respectively, by circulating coolant via predetermined routes. Each of the cooling systems 40a, 40b includes a supply pipe 41a, 41b, discharge pipe 42a, 42b, bypass pipe 43a, 43b, radiator 44a, 44b, bypass valve 45a, 45b, water pump (which will be referred to as "WP") 46a, 46b, and temperature sensor Ta, Tb.

The supply pipe 41a is connected to a coolant inlet manifold of the FC 4a. The discharge pipe 42a is connected to a coolant outlet manifold of the FC 4a. The bypass pipe 43a communicates with the supply pipe 41a and the discharge pipe 42a. The bypass valve 45a is provided in a connection portion of the supply pipe 41a and the bypass pipe 43a. The bypass valve 45a switches a state of communication between the supply pipe 41a and the bypass pipe 43a. The radiator 44a is connected to the supply pipe 41a and the discharge pipe 42a. The bypass valve 45a and the WP 46a are arranged from the upstream side on the supply pipe 41a. The WP 46a circulates coolant, between the FC 4a and the radiator 44a, via the supply pipe 41a and the discharge pipe 42a. The radiator 44a cools the coolant discharged from the FC 4a, by exchanging heat with the outside air. The bypass valve 45a and the WP 46a are driven, under control of the ECU 3. A temperature sensor Ta, which is provided on the discharge pipe 42a, detects the temperature of the coolant discharged from the FC 4a, and the ECU 3 obtains the detection result of the temperature sensor Ta. The supply pipe 41b, discharge pipe 42b, bypass pipe 43b, radiator 44b, bypass valve 45b, WP 46b, and temperature sensor Tb of the cooling system 40b are located and operate similarly to those of the cooling system 40a.

Each of the power control systems 30a, 30b includes a fuel cell DC/DC converter (which will be referred to as "FDC") 32a, 32b, battery DC/DC converter (which will be referred to as "BDC") 34a, 34b, accessories inverter (which will be referred to as "AINV") 39a, 39b, voltage sensor Va (first voltage detector) or voltage sensor Vb (second voltage detector), and current sensor Aa, Ab. Also, the power control systems 30a, 30b share a motor inverter (which will be referred to as "MINV") 38 connected to the motor 50. The FDCs 32a, 32b adjust DC power from the FCs 4a, 4b, respectively, and deliver the resulting power to the MINV 38. The BDCs 34a, 34b adjust DC power from the BATs 8a, 8b, respectively, and deliver the resulting power to the MINV 38. Electric power generated by the FCs 4a, 4b can be stored in the BATs 8a, 8b, respectively. The MINV 38 converts the received DC power into three-phase AC power, and supplies the power to the motor 50. The motor 50 drives the wheels 5, and causes the vehicle to travel.

The FC 4a and the BAT 8a can supply electric power to load devices other than the motor 50, via the AINV 39a. Similarly, the FC 4b and the BAT 8b can supply electric power to load devices via the AINV 39b. The load devices include accessories for the FCs 4a, 4b, and accessories for the vehicle. The accessories for the FCs 4a, 4b include the air compressors 14a, 14b, bypass valves 15a, 15b, back pressure valves 17a, 17b, tank valves 24a, 24b, pressure regulating valves 25a, 25b, INJs 26a, 26b, drain valves 28a, 28b, and HPs 29a, 29b. The accessories for the vehicle include, for example, an air conditioner, lighting devices, hazard lights, and so forth.

The current sensor Aa and the voltage sensor Va are connected to the FC 4a, and the current sensor Ab and the voltage sensor Vb are connected to the FC 4b. The current sensors Aa, Ab detect output currents of the FCs 4a, 4b, respectively, and the ECU 3 obtains the detection results. The voltage sensor Va detects a voltage of each unit cell of the FC 4a, and the ECU 3 obtains the detection result. The voltage sensor Vb detects a voltage of the whole FC 4b, and the ECU 3 obtains the detection result. The current sensor Aa and voltage sensor Va, and the current sensor Ab and voltage sensor Vb are used for controlling operation of the FCs 4a, 4b, respectively. For example, the ECU 3 obtains current-voltage characteristics of the FC 4a, based on the detection results of the current sensor Aa and voltage sensor Va, and sets a target current value of the FC 4a, referring to the current-voltage characteristics of the FC 4a, so that the actual output of the FC 4a becomes equal to the required output of the FC 4a. Then, the ECU 3 controls the FDC 32a so as to control a sweep current value of the FC 4a to the target current value. While the voltage sensor Va detects the voltage of each unit cell of the FC 4a, the ECU 3 calculates the voltage of the whole FC 4a by adding up voltages of the respective unit cells, and obtains the current-voltage characteristics of the FC 4a, based on the result of calculation. Similarly, the ECU 3 obtains current-voltage characteristics of the FC 4b, from the relationship between the output current and output voltage of the FC 4b, based on the detection results of the current sensor Ab and voltage sensor Vb, and sets a target current value of the FC 4b, referring to the current-voltage characteristics of the FC 4b, so that the actual output of the FC 4b becomes equal to the required output of the FC 4b. Then, the ECU 3 controls the FDC 32b, so as to control a sweep current value of the FC 4b to the target current value. In this manner, the ECU 3 controls the FCs 4a, 4b, based on the detection results of the voltage sensors Va, Vb. The voltage sensors Va, Vb are examples of the first and second voltage detectors, respectively, and will be described in detail later.

The ECU 3 includes a central processing unit (CPU), read-only memory (ROM), and a random access memory (RAM). The accelerator pedal position sensor 6, ignition switch 7, outside air temperature sensor 9, air compressors 14a, 14b, bypass valves 15a, 15b, back pressure valves 17a, 17b, tank valves 24a, 24b, pressure regulating valves 25a, 25b, INJs 26a, 26b, drain valves 28a, 28b, FDCs 32a, 32b, and BDCs 34a, 34b are electrically connected to the ECU 3. The ECU 3 calculates the required output P of the FCs 4a, 4b as a whole, based on a detected value of the accelerator pedal position sensor 6, and drive conditions of the accessories for the vehicle and accessories for the FCs 4a, 4b, electric power stored in the BATs 8a, 8b, etc. Also, the ECU 3 controls the accessories for the FCs, 4a, 4b, etc., according to the required output P, so as to control the total electric power generated by the FCs 4a, 4b. The required output P is output required to be generated by a fuel cell unit that consists of two or more fuel cells, and does not include output required to be generated by the BATs 8a, 8b, etc. other than the fuel cells.

Voltage Sensors Va and Vb

Figure 2A:
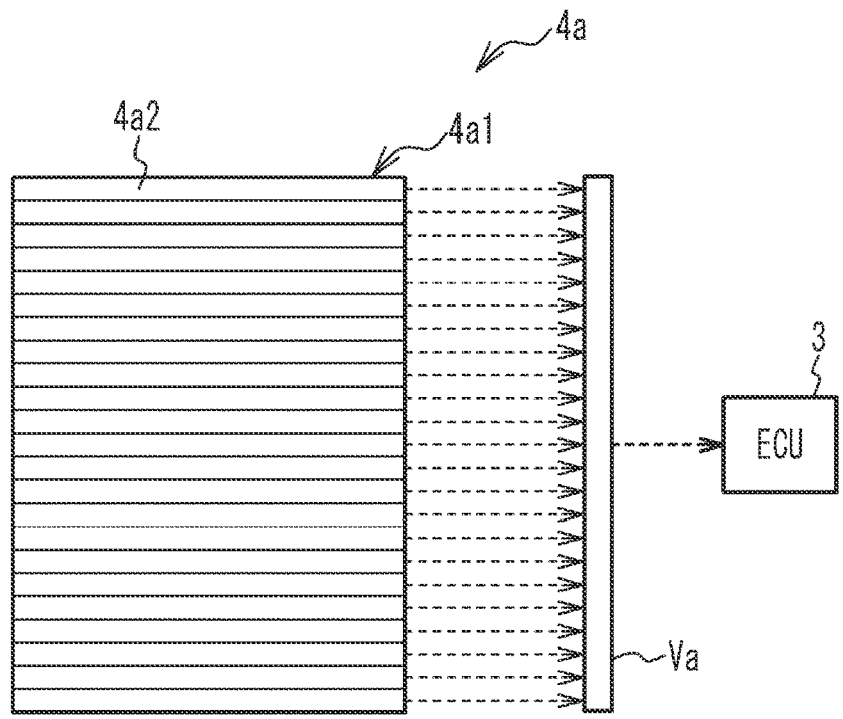
FIG. 2A is an explanatory view of a voltage sensor.
Figure 2B:
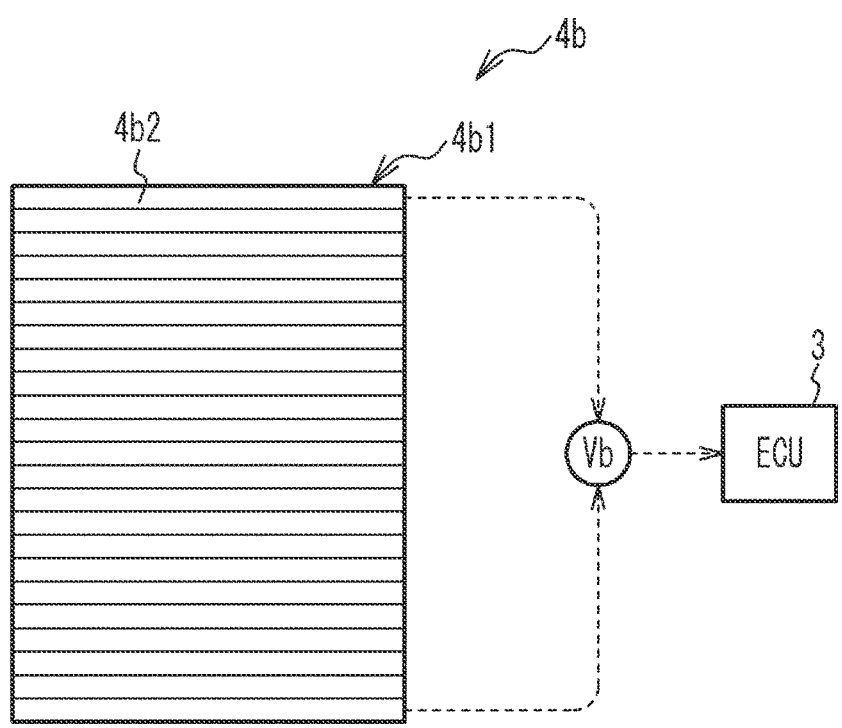
FIG. 2B is an explanatory view of another voltage sensor.

FIG. 2A and FIG. 2B show the voltage sensors Va, Vb, respectively. Initially, the FC 4a and the FC 4b will be described. The FC 4a has a plurality of unit cells 4a2 (first unit cells) that are laminated into a stack 4a1. At one end of the stack 4a1, a terminal plate, insulator, and end plate (not shown) are laminated in this order from the stack 4a1 side. Similarly, at the other end of the stack 4a1, a terminal plate, insulator and end plate are laminated in this order from the stack 4a1 side. The FC 4a includes these members. Similarly, the FC 4b has a plurality of unit cells 4b2 (second unit cells) that are laminated into a stack 4b1, and further has two terminal plates, two insulators, and two end plates. The unit cell 4a2 is identical with the unit cell 4b2. Also, the total number of the stacked unit cells 4a2 is equal to that of the unit cells 4b2.

The voltage sensor Va detects the voltage for each unit cell, with respect to all of the unit cells 4a2 of the FC 4a. Namely, the number of detection channels of the voltage sensor Va is equal to the total number of the stacked unit cells 4a2. On the other hand, the voltage sensor Vb detects the voltage of the whole stack 4b1, namely, the voltage of the whole FC 4b. Accordingly, the number of detection channels of the voltage sensor Vb is one. Thus, the number of detection channels of the voltage sensor Vb is smaller than that of the voltage sensor Va; therefore, the manufacturing cost of the voltage sensor Vb is lower than that of the voltage sensor Va. Accordingly, the manufacturing cost of the fuel cell system 1 of this embodiment is reduced, as compared with the case where the FC 4b is also provided with a voltage sensor that detects the voltage of each unit cell 4b2, like the FC 4a.

Fuel Deficiency State

Next, a fuel deficiency state will be described. For example, the FC 4a may be placed in a fuel deficiency state in which fuel gas is not sufficiently supplied to any of the unit cells 4a2, even when the fuel gas is supplied from the INJ 26a to the FC 4a. For example, the FC 4a is placed in the fuel deficiency state, when liquid water generated by power generation reaction remains in the anode channel 4aA, and the fuel gas is not sufficiently supplied to at least a part of a power generating region or regions of a part of the unit cells 4a2. Also, when liquid water remaining in the anode channel 4aA of the FC 4a freezes, due to reduction of the outside air temperature while the fuel cell system 1 is stopped, and the fuel gas is not sufficiently supplied to at least a part of the power generating region or regions of a part of the unit cells 4a2, due to the frozen water, or ice, even after starting of the fuel cell system 1, the unit cell or cells 4a2 are placed in the fuel deficiency state. The voltage of the unit cell 4a2 placed in the fuel deficiency state is reduced to be lower than the originally scheduled voltage, and the power generation efficiency deteriorates. Further, if the fuel deficiency state continues, carbon that supports the anode catalyst of the unit cell 4a2 and carbon that supports the cathode catalyst may undergo oxidation corrosion, and the anode catalyst and the cathode catalyst may be eluted, which may result in deterioration of the power generation performance. In this connection, when there is a deficiency of the oxidant gas supplied to the unit cells 4a2, the power generation performance is only temporarily reduced. However, when there is a deficiency of the fuel gas as described above, the subsequent power generation performance may be permanently reduced; thus, it is necessary to more appropriately detect the deficiency of the fuel gas, compared to the deficiency of the oxidant gas, and cancel the state of deficiency of the fuel gas. The unit cells 4b2 of the FC 4b may also be placed in the fuel deficiency state according to the same principle, and the same problem may occur.

Thus, when there is a possibility of a fuel deficiency state in any of the unit cells 4a2 of the FC 4a, for example, it is considered to perform a cancellation process for cancelling the fuel deficiency state, on the FC 4a. The cancellation process will be described in detail later. In this embodiment, the ECU 3 determines whether there is a fuel deficiency in any of the unit cells 4a2 of the FC 4a, while referring to the detection result of the voltage sensor Va, and performs the cancellation process on the FC 4a. Since the voltage sensor Va connected to the FC 4a detects the voltage of each unit cell 4a2, as described above, the ECU 3 can determine, with high accuracy, whether there is a fuel deficiency in any of the unit cells 4a2, and can also highly accurately grasp any change of the voltage of each unit cell 4a2, during execution of the cancellation process. For example, when the voltage of the unit cell 4a2, which was largely reduced before execution of the cancellation process, is sufficiently recovered through execution of the cancellation process, the cancellation process can be stopped on the assumption that the cancellation process need not be continued any longer. Also, when the voltage of a part of the unit cells 4a2 cannot be recovered through execution of the cancellation process, power generation of the FC 4a itself may be stopped, so as to prevent reduction of the output performance of the unit cell(s) 4a2 in question. Thus, the ECU 3 can determine, with high accuracy, whether there is a fuel deficiency in any of the unit cells 4a2, by referring to each voltage of the unit cells 4a2, and take appropriate measures on the FC 4a, based on each voltage of the unit cells 4a2 during execution of the cancellation process.

Similarly, when there is a possibility of a fuel deficiency state in any of the unit cells 4b2 of the FC 4b, it may be considered to perform the cancellation process on the FC 4b, while referring to the detection result of the voltage sensor Vb. However, since the voltage sensor Vb connected to the FC 4b detects the voltage of the whole FC 4b, it is difficult to grasp change of the voltage of each unit cell 4b2. Thus, the ECU 3 may not be able to correctly determine whether any of the unit cells 4b2 of the FC 4b is in a fuel deficiency state, while referring to the detection result of the voltage sensor Vb. For example, even when only one unit cell of the FC 4b is placed in a fuel deficiency state, and the voltage of the unit cell 4b2 is reduced, the voltage sensor Vb, which detects the voltage of the whole FC 4b, indicates a small rate of change in the voltage of the whole FC 4b. Accordingly, it is difficult to determine whether the voltage of each unit cell 4b2 is almost uniformly reduced due to a factor other than fuel deficiency, or whether only one unit cell is placed in the fuel deficiency state, and its voltage is largely reduced. Namely, it is difficult to determine, with high accuracy, whether there is a fuel deficiency in any of the unit cells 4b2. Also, even if the ECU 3 performs the cancellation process on the FC 4b, while referring to the detection result of the voltage sensor Vb, it cannot determine whether the voltage of the unit cell 4b2 that was in the fuel deficiency state has been recovered, and has a difficulty in taking appropriate measures on the FC 4b. In this embodiment, when there is a possibility that at least any of the unit cells 4a2 of the FC 4a and the unit cells 4b2 of the FC 4b is placed in the fuel deficiency state, the ECU 3 performs the cancellation process on the FC 4a, while referring to the detection result of the voltage sensor Va, and stops power generation of the FC 4b.

Fuel Deficiency Cancellation Control

Figure 3:
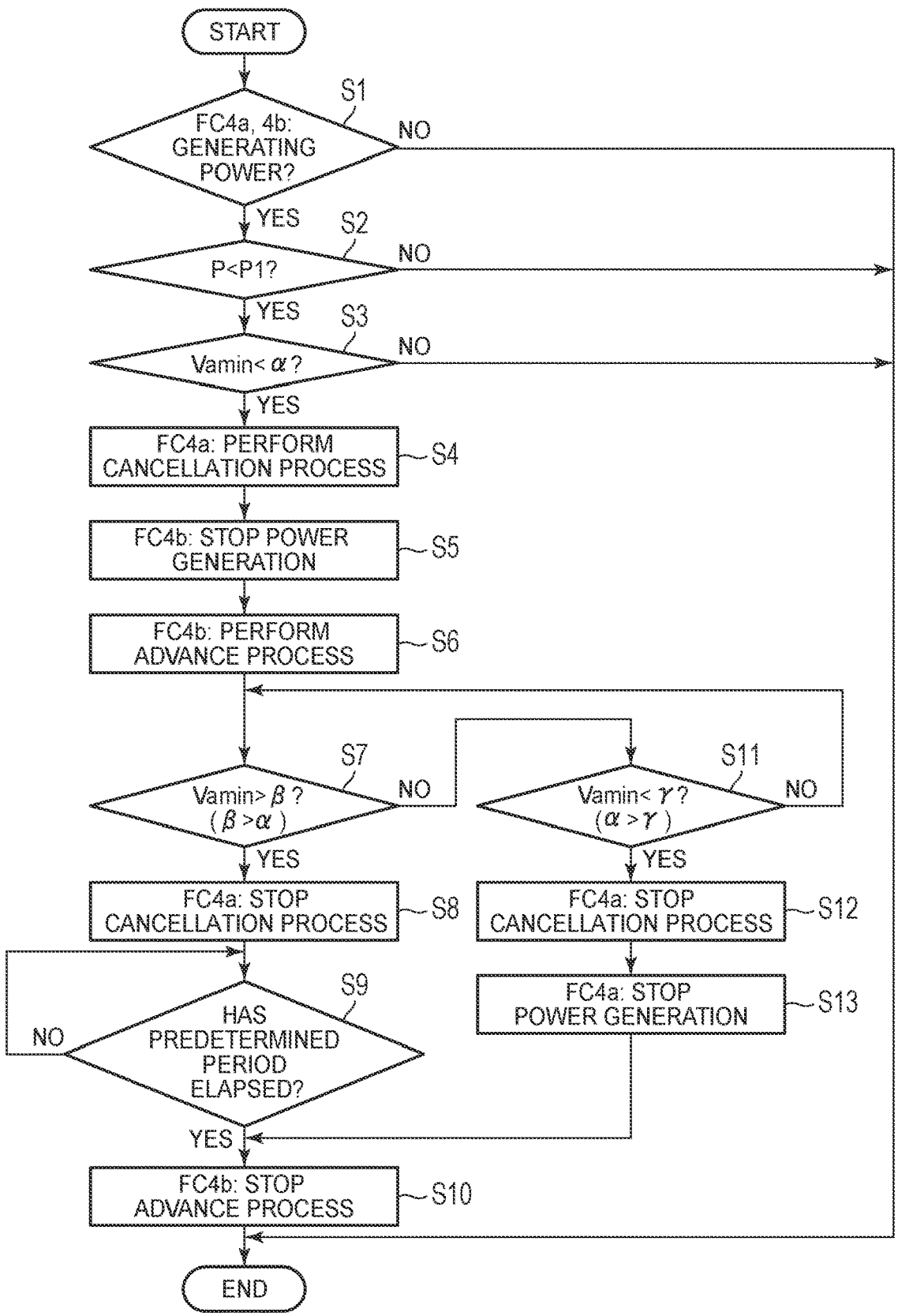
FIG. 3 is a flowchart showing one example of fuel deficiency determination control of one embodiment.

FIG. 3 is a flowchart illustrating one example of fuel deficiency cancellation control of this embodiment. The control routine of FIG. 3 is repeatedly executed. Initially, the ECU 3 determines whether the FCs 4a, 4b are generating electric power (step S1). When current values respectively detected by the current sensors Aa, Ab are equal to or larger than zero, for example, the ECU 3 can determine that the FCs 4a, 4b are both generating electric power. When a negative decision (NO) is obtained in step S1, the current cycle of the control routine ends.

When an affirmative decision (YES) is obtained in step S1, the ECU 3 determines whether the required output P of the FCs 4a, 4b is smaller than a threshold value P1 (step S2). The threshold value P1 is a value that can be satisfied by the output of only the FC 4a. For example, when the vehicle is traveling at a low speed, or when the vehicle is temporarily stopped and the accelerator pedal is not operated, the required output P is smaller than the threshold value P1. When a negative decision (NO) is obtained in step S2, the current cycle of the control routine ends.

When an affirmative decision (YES) is obtained in step S2, the ECU 3 determines whether the minimum value Vamin, out of respective voltages of the unit cells 4a2, is lower than a threshold value α, by referring to the detection result of the voltage sensor Va (step S3). The threshold value α is a voltage value based on which the unit cell 4a2 can be regarded as being in a fuel deficiency state, and is smaller than the lower limit of voltage to which the voltage of the unit cell 4a2 is not positively controlled when the FC 4a is in a normal operating state during power generation When a negative decision (NO) is obtained in step S3, the ECU 3 determine that none of the unit cells 4a2 of the FC 4a is in a fuel deficiency state, and the current cycle of the control routine ends.

The threshold value α is equal to 0.1 V, for example, but is not limited to this value. For example, the threshold value α may be equal to or higher than −0.2 V, and lower than 0.2 V, and, preferably, is equal to or higher than 0 V, and lower than 0.15 V. The reason why the threshold value α is equal to or higher than −0.2 V is as follows: when the voltage of a unit cell 4a2 becomes equal to or lower than −0.2 V, elution of the anode catalyst of the unit cell 4a2 proceeds largely, and the output performance of the unit cell 4a2 may be subsequently reduced. It is preferable that the threshold value α is equal to or higher than 0 V, because reduction of the power generation efficiency can be curbed, if the cancellation process for cancelling the fuel deficiency state as described later is performed, before the voltage of the unit cell 4a2 that is in the fuel deficiency state reaches a negative voltage. The threshold value is set to be lower than 0.2 V, because, if the threshold value is set to a value that is higher than the lower limit of the preset control range of the voltage of the unit cells 4a2, the ECU 3 may determine that any of the unit cells 4a2 is in a fuel deficiency state, even though it is in a normal state. The threshold value α is preferably lower than 0.15 V, because the voltage of any of the unit cells 4a2 may become lower than 0.2 V, due to a factor (such as insufficient supply of the oxidant gas, for example) other than the fuel deficiency state. Also, while liquid water temporarily remains in the anode channel 4aA, and the voltage of any of the unit cells 4a2 is reduced, whereby the unit cell 4a2 is temporarily placed in a fuel deficiency state, the remaining liquid water may be immediately discharged due to change of the operating state of the FC 4a, and the fuel deficiency state may be immediately cancelled.

When an affirmative decision (YES) is obtained in step S3, the ECU 3 determines that any of the unit cells 4a2 of the FC 4a is already in the fuel deficiency state, and there is a possibility that any of the unit cells 4b2 of the FC 4b reaches a fuel deficiency state. Thus, the ECU 3 performs the cancellation process for cancelling the fuel deficiency state on the FC 4a while it is in a power generating state (step S4), and stops power generation of the FC 4b (step S5). Also, the ECU 3 performs an advance process for cancelling a factor that causes a fuel deficiency state, before start of power generation of the FC 4b (step S6). With the cancellation process performed on the FC 4a, and the advance process performed on the FC 4b, the output performance of the unit cells 4a2, 4b2 of the FCs 4a, 4b is less likely or unlikely to be reduced.

When there is a possibility that any of the unit cells 4a2 of the FC 4a is placed in a fuel deficiency state, there may be assumed to be a possibility that any of the unit cells 4b2 of the FC 4b is also placed in a fuel deficiency state. While the fuel deficiency state of any of the unit cells 4a2 of the FC 4a is caused by liquid water or ice in the anode channel 4aA of the FC 4a, as described above, the amount of the liquid water or ice depends on the ambient temperature of the FC 4a, and the ambient temperatures of the FC 4a and FC 4b are often substantially equal to each other, since the FCs 4a, 4b are installed on the same vehicle. Thus, the cancellation process as described later is performed on the FC 4a while it keeps generating power, whereas power generation of the FC 4b is stopped, so that the voltage of any of the unit cells 4b2 of the FC 4b is prevented from continuing to be reduced, which would result in reduction of the output performance.

Cancellation Process on FC 4a

The cancellation process performed on the FC 4a to cancel a fuel deficiency state includes a drainage promotion process for promoting drainage of liquid water from the FC 4*a*, and a temperature elevation process for raising the temperature of the FC 4*a*.

The drainage promotion process performed on the FC 4*a* is a process for cancelling a fuel deficiency state caused by liquid water remaining in the anode channel 4*a*A, by promoting discharge of liquid water remaining in the anode channel 4*a*A. The drainage promotion process on the FC 4*a* is, for example, at least one of (aa) operation to increase the valve-opening period of the INJ 26*a* to a longer period than that in a normal operating state, and (ba) operation to increase the rotating speed of the HP 29*a* to a higher speed than that in the normal operating state. Through the operation (aa), the pressure of the fuel gas injected from the INJ 26*a* increases, and discharge of liquid water remaining in the anode channel 4*a*A can be promoted. In this connection, the INJ 26*a* is actually intermittently opened, and the operation (aa) is implemented by increasing the ratio of the valve-opening period to the overall period as the sum of the valve-opening period and the valve-closing period. Also, through the operation (ba), the pressure of the fuel gas that circulates through the anode channel 4*a*A increases, and discharge of liquid water from the anode channel 4*a*A can be promoted. Both the operation (aa) and operation (ba) may be carried out.

The temperature elevation process performed on the FC 4*a* is a process for cancelling a fuel deficiency state, by raising the temperature of the FC 4*a* so as to promote evaporation of liquid water remaining in the anode channel 4*a*A, or promote melting of ice present in the anode channel 4*a*A. The temperature elevation process on the FC 4*a* is, for example, at least one of (ca) operation to reduce the power generation efficiency of the FC 4*a* by reducing the stoichiometric ratio of the oxidant gas supplied to the FC 4*a* to a lower ratio than that in the normal operating state, (da) operation to reduce the flow rate of coolant that circulates through the FC 4*a* or stop flow of the coolant, by reducing the rotating speed of the WP 46*a* to a lower speed than that in the normal operating state or stopping the WP 46*a*, and (ea) operation to reduce the flow rate of coolant that flows through the radiator 44*a* to a smaller rate than that in the normal operating state, by controlling the opening of the bypass valve 45*a*. Through the operation (ca), the amount of heat generated in the FC 4*a* is increased, and the temperature of the FC 4*a* can be elevated. The "stoichiometric ratio" indicates the amount of reaction gas supplied, to the theoretical amount of reaction gas determined based on the required amount of electric power to be generated. Through the operation (da), the cooling efficiency of the FC 4*a* is reduced, and the temperature of the FC 4*a* can be elevated. Through the operation (ea), the temperature of the coolant can be raised, and the temperature of the FC 4*a* can be elevated. Two or more of the operations (ca), (da), (ea) may be carried out at the same time.

When the outside air temperature is equal to or higher than 0° C., and a predetermined time has elapsed from starting of the fuel cell system 1, fuel deficiency is supposed to be caused by liquid water remaining in the anode channel 4*a*A, and the drainage promotion process may be carried out as the cancellation process. When the outside temperature is equal to or lower than 0° C., and the predetermined time has not elapsed from starting of the fuel cell system 1, fuel deficiency is supposed to be caused by ice present in the anode channel 4*a*A, and the temperature elevation process may be carried out as the cancellation process. Also, the drainage promotion process and temperature elevation process may be carried out at the same time. For example, when ice is present in the anode channel 4*a*A, melting of the ice can be promoted through the temperature elevation process, and discharge of liquid water that increased in amount due to melting of ice can be promoted through the drainage promotion process.

Advance Process on FC 4*b*

The advance process for cancelling a factor that leads to a fuel deficiency state, before the FC 4*b* starts generating electric power, also includes a drainage promotion process to promote drainage of liquid water from the FC 4*b*, and a temperature elevation process to elevate the temperature of the FC 4*b*. Both of the processes are performed when power generation is stopped in the FC 4*b*.

The drainage promotion process performed on the FC 4*b* is a process for cancelling a fuel deficiency state caused by liquid water remaining in the anode channel 4*b*A in advance, before the start of power generation, by promoting discharge of liquid water remaining in the anode channel 4*b*A. The drainage promotion process on the FC 4*b* is, for example, at least one of (ab) operation to drive the INJ 26*b* while power generation is stopped in the FC 4*b*, and (bb) operation to drive the HP 29*b* while power generation is stopped in the FC 4*b*. Through the operation (ab), the pressure of the fuel gas in the anode channel 4*b*A is increased, and drainage of liquid water remaining in the anode channel 4*b*A can be promoted, due to the pressure of the fuel gas injected from the INJ 26*b*. Also, through the operation (bb), the pressure of the fuel gas circulating through the anode channel 4*b*A is increased, and drainage of liquid water from within the anode channel 4*b*A can be promoted. Both of the operations (ab) and (bb) may be carried out.

The temperature elevation process performed on the FC 4*b* is a process for cancelling a fuel deficiency state, by raising the temperature of the FC 4*b* while power operation is stopped in the FC 4*b*, so as to promote evaporation of liquid water remaining in the anode channel 4*b*A, or promote melting of ice present in the anode channel 4*b*A. The temperature elevation process performed on the FC 4*b* in which power generation is stopped is, for example, at least one of (cb) operation to raise the temperature of the FC 4*b* by utilizing heat generated by the FC 4*a*, and (db) operation to heat the FC 4*b* by use of a heater, for example.

Through the operation (cb), the temperature of the FC 4*b* in which power generation is stopped is increased by efficiently using heat generated by the FC 4*a*, so that condensed water in the anode channel 4*b*A of the FC 4*b* can be reduced, or melting of ice in the anode channel 4*b*A can be promoted, for example. In the operation (cb), the FC 4*a* and the FC 4*b* are preferably located so close to each other that the temperature of the FC 4*b* can be raised by heat generated by the FC 4*a*. For example, the respective stacks 4*a*1, 4*b*1 of the FCs 4*a*, 4*b* may be housed in a common case. The operation (cb) is not limited to the above example. For example, at least one of the discharge pipes 12*a*, 22*a*, 42*a*, through which the oxidant gas, fuel gas, and coolant discharged from the FC 4*a* respectively flow, may be provided so as to surround the FC 4*b*. With this arrangement, the heat of the FC 4*a* can be transmitted to the FC 4*b*, via at least one of the oxidant gas, fuel gas, and coolant discharged from the FC 4*a*. When only the operation (cb) is performed as the advance process, no special operation need be performed on the FC 4b, and continuing power generation in the FC 4a corresponds to the advance process on the FC 4b.

Through the operation (db), the temperature of the FC 4b in which power generation is stopped can be raised promptly, and the cause of the fuel deficiency state in the FC 4b can be cancelled promptly. To perform the operation (db), it is necessary to provide, in advance, a heater capable of heating the stack 4b1 of the FC 4b.

Similarly to the cancellation process as described above, when the outside air temperature is equal to or higher than the freezing point, and a predetermined time has elapsed from starting of the fuel cell system 1, fuel deficiency is supposed to be caused by liquid water remaining in the anode channel 4bA, and the drainage promotion process may be carried out as the advance process. When the outside temperature is below the freezing point, and the predetermined time has not elapsed from starting of the fuel cell system 1, fuel deficiency is supposed to be caused by ice present in the anode channel 4bA, and the temperature elevation process may be carried out as the advance process. Also, the drainage promotion process and temperature elevation process may be carried out at the same time.

Referring again to the flowchart of FIG. 3, the ECU 3 determines whether the minimum value Vamin is larger than a threshold value $\beta$ (step S7). The threshold value $\beta$ is larger than the threshold value $\alpha$, and is set to a voltage value that is higher by a given margin than the minimum value of voltage values that can be taken by the unit cells 4a2 in which the fuel deficiency state has been cancelled. The threshold value $\beta$ is 0.2 V, for example, but is not limited to this value.

When an affirmative decision (YES) is obtained in step S7, the ECU 3 assumes that the fuel deficiency state has been cancelled in the FC 4a, and stops the cancellation process (step S8). Then, the ECU 3 determines whether a predetermined period has elapsed since the advance process started being performed on the FC 4b (step S9). The predetermined period is set to a period necessary to sufficiently cancel the cause of the fuel deficiency with regard to any of the unit cells 4b2 of the FC 4b, as measured from the time when the advance process was started. When a negative decision (NO) is obtained in step S9, step S9 is executed again. When an affirmative decision (YES) is obtained in step S9, the ECU 3 stops the advance process (step S10). When the advance process is only the operation (cb), step S9 and step S10 may not be executed.

When a negative decision (NO) is obtained in step S7, the ECU 3 determines whether the minimum value Vamin is smaller than a threshold value $\gamma$ (step S11). The threshold value $\gamma$ is smaller than the threshold value $\alpha$, and is set to a voltage value at which the voltage of the unit cell or cells 4a2 may be further lowered to be negative, and the output performance of the unit cells 4a2 may be largely deteriorated. The threshold value $\gamma$ is −0.2 V, for example, but is not limited to this value. When a negative decision (NO) is obtained in step S11, step S7 is executed again. Namely, when negative decisions (NO) are obtained in step S7 and step S11, the advance process and cancellation process as described above are continued.

When an affirmative decision (YES) is obtained in step S11, the ECU 3 stops performing the cancellation process on the FC 4a (step S12), stops power generation in the FC 4a (step S13), and further stops the advance process (step S10), so as to prevent the output performance of the unit cells 4a2 from being reduced. When an affirmative decision (YES) is obtained in step S11, there may be some abnormality in the FC 4a, etc., and there is a similar possibility with regard to the FC 4b; therefore, power generation of the FC 4a is stopped, and the advance process on the FC 4b is stopped. In this case, the vehicle is caused to travel in a limp-home mode, using electric power of the BATs 8a, 8b, and a warning lamp installed in the cabin may be turned on, for example, so as to encourage the driver to have the vehicle inspected or repaired.

As described above, the ECU 3 determines, with high accuracy, whether any of the unit cells 4a2 of the FC 4a is in a fuel deficiency state, by referring to the detection result of the voltage sensor Va connected to the FC 4a (step S3). Also, the ECU 3 determines whether the cancellation process that is being performed on the FC 4a can be stopped, by referring to the detection result of the voltage sensor Va (steps S4, S7, S8, S11, S12). Namely, the ECU 3 can take appropriate measures on the FC 4a, based on each voltage of the unit cells 4a2 during execution of the cancellation process.

Also, as described above, the manufacturing cost of the voltage sensor Vb connected to the FC 4b is lower than that of the voltage sensor Va connected to the FC 4a; therefore, the manufacturing cost of the fuel cell system 1 is reduced. Further, power generation is stopped in the FC 4b to which the voltage sensor Vb that detects the voltage of the whole FC 4b is connected. Thus, at least during stopping of power generation, the voltage of any of the unit cells 4b2 is prevented from being negative, and the output performance is less likely or unlikely to be deteriorated. Thus, deterioration of the output performance of the fuel cell system 1 is curbed, while the manufacturing cost of the system 1 is reduced.

In the illustrated embodiment, when the required output P is smaller than the threshold value P1 (YES in step S2), the cancellation process is performed on the FC 4a (step S4), while power generation is stopped in the FC 4b and the advance process is performed on the FC 4b (steps S5 and S6). Therefore, it is possible to curb deterioration of the output performance of the FCs 4a and 4b, while satisfying the required output P. In this connection, step S2 may not be executed. In this case, the required output P may be satisfied by the sum of the output of the FC 4a, and the output of at least one of the BATs 8a, 8b.

In the illustrated embodiment, the ECU 3 determines whether the cancellation process is required to be performed on the FC 4a, and whether it can be stopped, by referring to the detection result of the voltage sensor Va. However, the disclosure is not limited to this arrangement, but the ECU 3 may control the content of the cancellation process itself, by referring to the detection result of the voltage sensor Va. For example, the cancellation process may be performed so as to increase energy consumed for cancelling the cause of the fuel deficiency state of the FC 4a, as the minimum value Vamin is smaller. As the minimum value Vamin is smaller, the voltage of the unit cell 4a2 having the minimum value is more likely to be negative, and the output performance is more likely to deteriorate. Thus, if the cause of the fuel deficiency state is cancelled from the FC 4a promptly, deterioration of the output performance of the unit cell 4a2 can be prevented. For example, as the minimum value Vamin is smaller, the valve-opening period of the INJ 26a or the rotating speed of the HP 29a may be increased, so as to promote drainage of water from the anode channel 4aA of the FC 4a. Also, as the minimum value Vamin is smaller, the target temperature to which the temperature of the FC 4b is to be raised may be set to a higher level, so that ice in the anode channel 4aA can be melted promptly. Also, as the minimum value Vamin is smaller, a larger number of operations, out of the above operations (aa) to (ea), may be performed at the same time.

The cancellation process may also be performed so as to increase energy consumed for cancelling the cause of the fuel deficiency state of the FC 4a, as a period for which the minimum value Vamin is equal to or smaller than the threshold value β and is equal to or larger than the threshold value γ during execution of the cancellation process, namely, a period for which negative decisions (NO) are repeatedly obtained in step S7 and step S11, is longer. For example, as the above period is longer, the valve-opening period of the INJ 26a or the rotating speed of the HP 29a may be increased, or a larger number of operations, out of the above operations (aa) to (ea), may be performed at the same time.

Also, the content of the advance process itself may be controlled, by referring to the detection result of the voltage sensor Va. For example, the advance process may be performed so as to increase energy consumed for cancelling the cause of the fuel deficiency state of the FC 4b, as the minimum value Vamin is smaller. For example, as the minimum value Vamin is smaller, the valve-opening period of the INJ 26b or the rotating speed of the HP 29b may be increased, so as to promote drainage of water from the anode channel 4bA of the FC 4b.

In the illustrated embodiment, the advance process performed on the FC 4b can be stopped (step S10), after an affirmative decision (YES) is obtained in step S7 or step S11. However, the disclosure is not limited to this arrangement. For example, when a predetermined period elapses from the start of the advance process, the advance process may be stopped, irrespective of the results of determination in step S7 and step S11.

First Modified Example of Fuel Deficiency Cancellation Control

Figure 4:
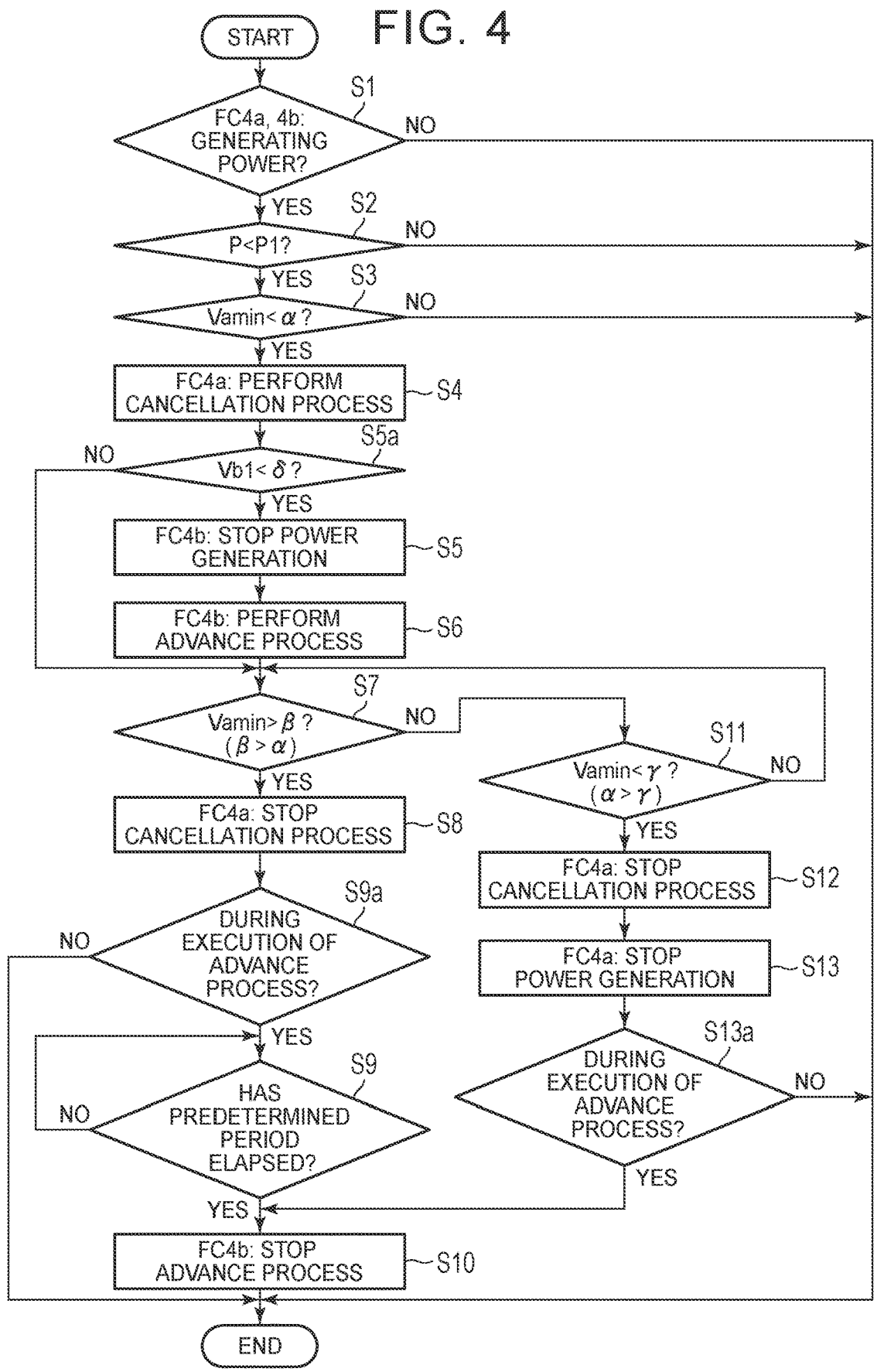
FIG. 4 is a flowchart showing a first modified example of the fuel deficiency determination control.

FIG. 4 is a flowchart showing a first modified example of fuel deficiency cancellation control. In FIG. 4, the same step numbers are assigned to the same steps as those of the control routine of the illustrated embodiment, and these steps will not be repeatedly described.

In the first modified example, the ECU 3 determines whether a voltage value Vb1 detected by the voltage sensor Vb connected to the FC 4b is smaller than a threshold value δ (step S5a), between step S4 and step S5 described above. The voltage value Vb1 is one example of voltage parameter correlated with the voltage of the FC 4b. The threshold value δ, which is set according to the output current of the FC 4b, is set to a smaller value as the output current of the FC 4b is larger. This is because the output voltage is reduced as the output current of the FC 4b is larger. Also, the threshold value δ is set to a value that is lower than the output voltage of the FC 4b corresponding to the output current of the FC 4b in a normal state where none of the unit cells 4b2 is in a fuel deficiency state.

When an affirmative decision (YES) is obtained in step S5a, the degree of reduction of the voltage of the FC 4b is large. In this case, there is a possibility that at least one of the unit cells 4b2 of the FC 4b is in a fuel deficiency state; thus, power generation of the FC 4b is stopped, and the advance process is executed (steps S5, S6). When a negative decision (NO) is obtained in step S5a, steps S5 and S6 are not executed, and the FC 4b continues to generate electric power.

Also, in the first modified example, the ECU 3 determines whether the advance process is being executed (step S9a), between step S8 and step S9 described above. When a negative decision (NO) is obtained in step S9a, the current cycle of this control routine ends. When an affirmative decision (YES) is obtained in step S9a, step S9 and step S10 are executed. Also, the ECU 3 determines whether the advance process is being executed (step S13a), after execution of step S13. When a negative decision (NO) is obtained in step S13a, the current cycle of this control routine ends. When an affirmative decision (YES) is obtained in step S13a, step S10 is executed.

The above-indicated threshold value δ may be a fixed value. For example, the threshold value δ may be set to a value that is smaller than the minimum value of the output voltage which can be taken when the output current of the FC 4b is equal to or smaller than a predetermined value, in a normal state in which none of the unit cells 4b2 is in a fuel deficiency state. In this case, when the output current of the FC 4b becomes equal to or smaller than the predetermined value, the ECU 3 determines whether the voltage value Vb1 of the voltage sensor Vb is smaller than the threshold value γ.

In the case where the FC 4b is provided with a voltage sensor adapted to detect the voltage for every two or more unit cells, for example, the ECU 3 may determine in step S5a that the voltage of the FC 4b is smaller than the threshold value δ, when any of two or more detection values obtained by the voltage sensor is smaller than the threshold value. Also, in the case where the FC 4b is provided with a voltage sensor adapted to detect the voltage for every two or more unit cells, for example, the ECU 3 may determine that the voltage of the FC 4b is smaller than the threshold value γ, when the average of two or more detection values obtained by the voltage sensor is smaller than the threshold value. Also, when the reciprocal of the voltage value Vb1 is equal to or larger than a predetermined threshold value, the ECU 3 may determine that the voltage of the FC 4b is smaller than the threshold value γ. The two or more detection values obtained by the voltage sensor, the average of the detection values, the reciprocal of the voltage value Vb1, etc. are examples of voltage parameters correlated with the voltage of the FC 4b.

Second Modified Example of Fuel Deficiency Cancellation Control

Figure 5:
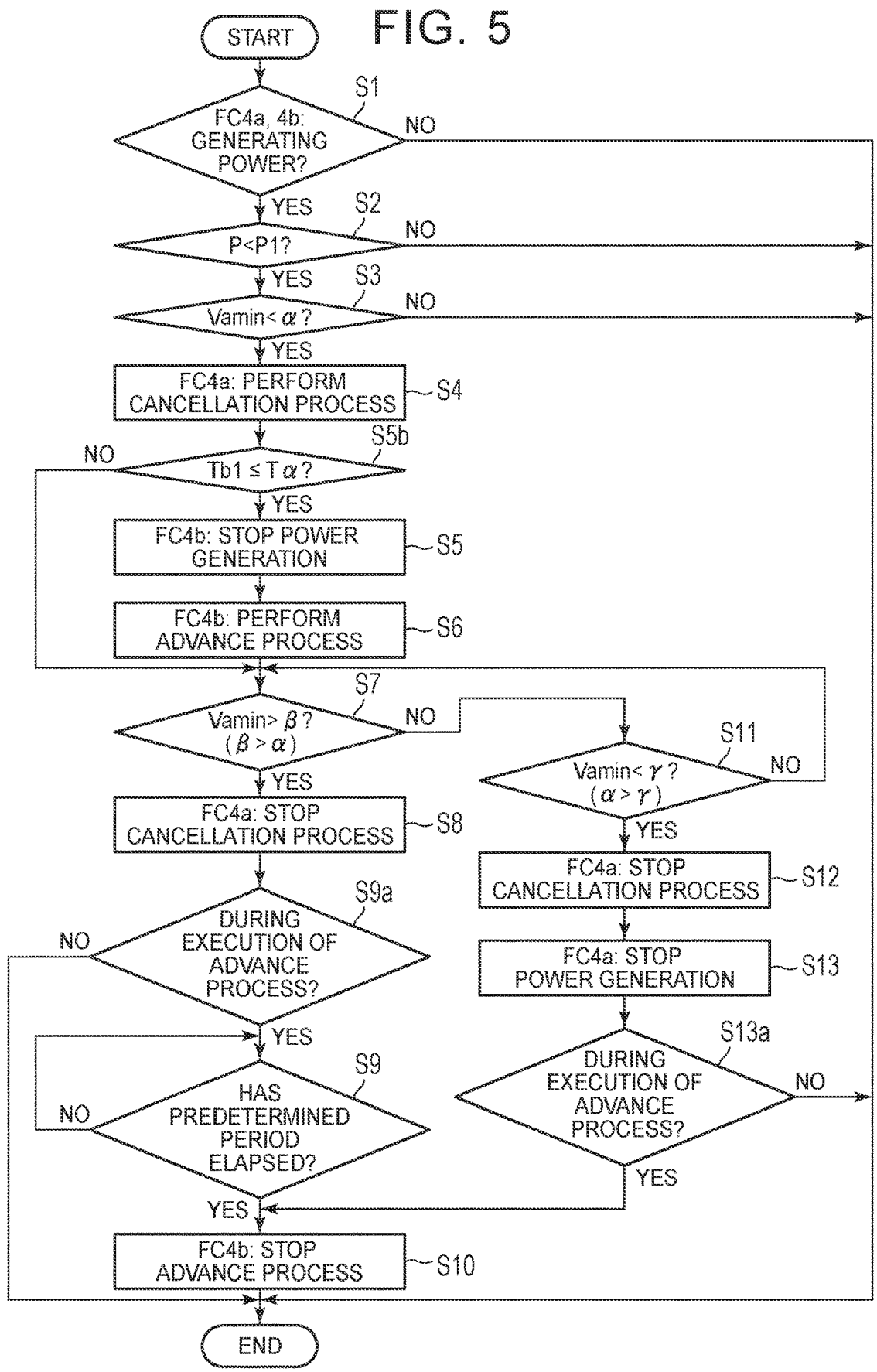
FIG. 5 is a flowchart showing a second modified example of the fuel deficiency determination control.

FIG. 5 is a flowchart showing a second modified example of fuel deficiency cancellation control. In the second modified example, the ECU 3 determines whether the temperature Tb1 detected by the temperature sensor Tb that detects the temperature of coolant of the FC 4b is equal to or lower than a threshold value Tα (step S5b), instead of executing step S5a described above. The temperature Tb1 is one example of temperature parameter correlated with the temperature of the FC 4b. The threshold value Tα is 30° C., for example. When the temperature Tb1 is equal to or lower than 30° C. as the threshold value Tα, it may be considered that condensed water is likely to be generated in the anode channel 4bA of the FC 4b. Also, the threshold value Tα may be 0° C., for example. When the temperature Tb1 is equal to or lower than 0° C., it may be considered that ice is present in the anode channel 4bA of the FC 4b.

In the second modified example, the temperature of the coolant of the FC 4b is detected as the temperature of the FC 4b, but the temperature of the FC 4b is not limited to this. For example, a temperature sensor that directly detects the temperature of the FC 4b may be used, or a temperature sensor that is not in direct contact with the FC 4b, but is located in the vicinity of the FC 4*b* where the temperature of the FC 4*b* is sufficiently transmitted to the sensor, may be used. Also, the temperature of the outside air temperature sensor 9 that detects the outside air temperature, rather than the temperature of the FC 4*b*, may be used. This is because the temperature of the FC 4*b* is supposed to be lower as the outside air temperature is lower. Accordingly, in step S5*b*, when the temperature detected by any of these temperature sensors is equal to or lower than a threshold value, the ECU 3 may determine that the temperature of the FC 4*b* is equal to or lower than the threshold value Tα. Also, when the reciprocal of the temperature Tb1 is equal to or higher than a predetermined threshold value, the ECU 3 may determine that the temperature of the FC 4*b* is equal to or lower than the threshold value Tα. The temperatures detected as described above, the reciprocal of the temperature Tb1, etc. are examples of temperature parameters correlated with the temperature of the FC 4*b*.

Both of the above-indicated step S5*a* and step S5*b* may be executed, and step S5 and step S6 may be executed, only when affirmative decisions (YES) are obtained in steps S5*a* and S5*b*. Thus, the ECU 3 can determine, with improved accuracy, whether there is a possibility that at least one of the unit cells 4*a*2 and 4*b*2 is placed in a fuel deficiency state.

Third Modified Example of Fuel Deficiency Cancellation Control

Figure 6:
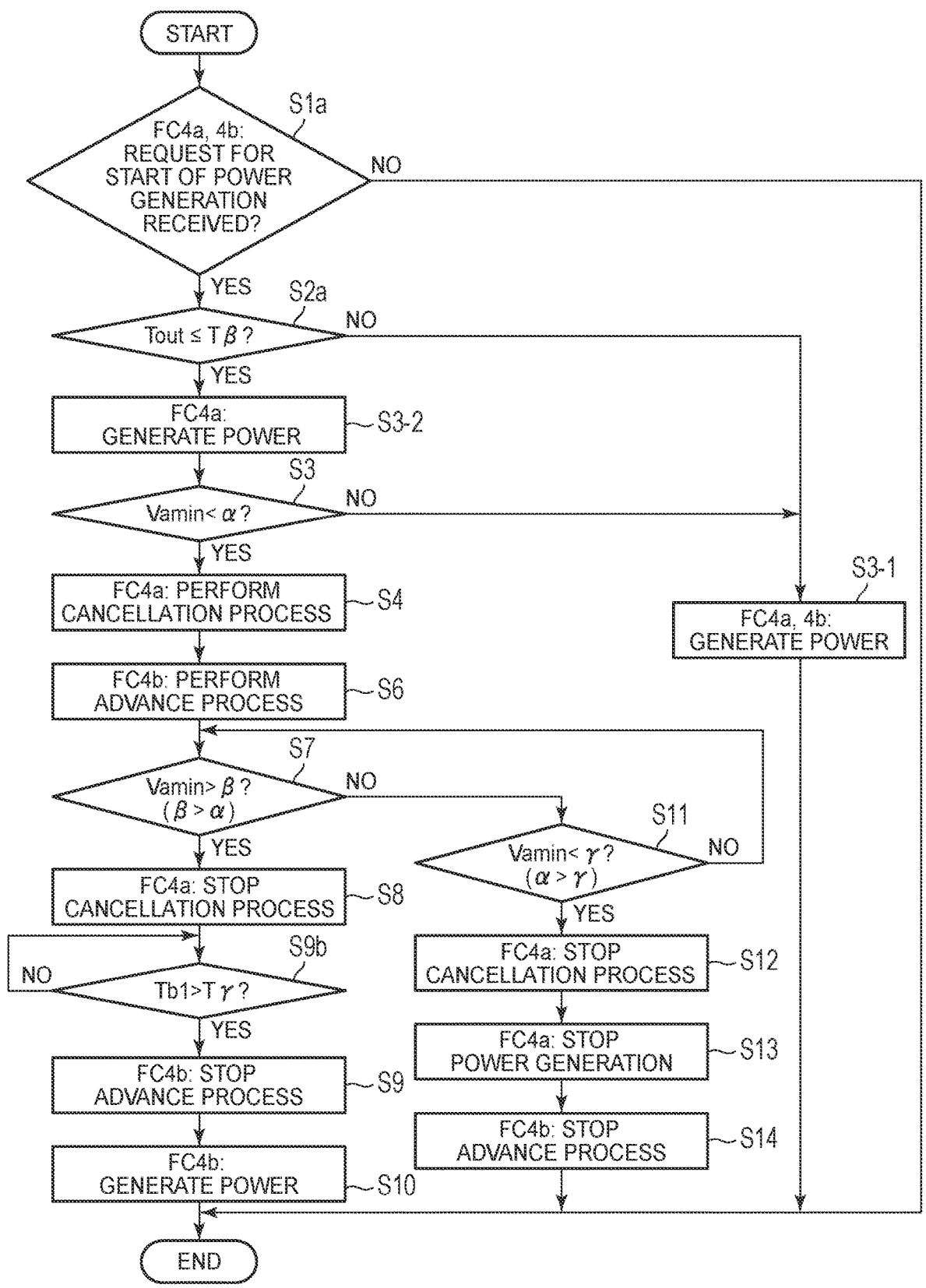
FIG. 6 is a flowchart showing a third modified example of the fuel deficiency determination control.

FIG. 6 is a flowchart showing a third modified example of fuel deficiency cancellation control. The ECU 3 determines whether requests for start of power generation are generated to the FC 4*a* and the FC 4*b* (step S1*a*). The case where the requests for start of power generation are generated to both of the FC 4*a* and the FC 4*b* is, more specifically, the case where requests for start of power generation are generated to both of the FC 4*a* and the FC 4*b*, in a condition where power generation is stopped in both of the FC 4*a* and the FC 4*b*. For example, power generation is stopped in the FC 4*a* and the FC 4*b* immediately after the ignition switch 7 is switched from OFF to ON, and the FC 4*a* and the FC 4*b* are requested to start generating electric power. Also, in a system in which power generation of both of the FC 4*a* and the FC 4*b* are temporarily stopped when the vehicle is temporarily stopped, when the accelerator pedal is operated in this condition, and a request to start the vehicle is generated, the FC 4*a* and the FC 4*b* are requested to start generating electric power. When a negative decision (NO) is obtained in step S1*a*, the current cycle of the control routine ends.

When an affirmative decision (YES) is obtained in step S1*a*, the ECU 3 determines whether the temperature Tout of the outside air temperature sensor 9 is equal to or lower than a threshold value Tβ (step S2*a*). The temperature Tout is one example of outside air temperature parameter correlated with the outside air temperature. The threshold value Tβ is 0° C., for example, but is not limited to this value. When a negative decision (NO) is obtained in step S2*a*, the ECU 3 starts power generation of the FC 4*a* and the FC 4*b* (step S3-1). When an affirmative decision (YES) is obtained in step S2*a*, the ECU 3 starts power generation of the FC 4*a* only (step S3-2), and determines whether the minimum value Vamin of the respective voltages of the unit cells 4*a*2 is smaller than the threshold value α, by referring to the detection result of the voltage sensor Va (step S3). When an affirmative decision (YES) is obtained in step S3, the cancellation process is performed (step S4), and further, the advance process is performed on the FC 4*b* in which power generation is stopped (step S6). When an affirmative decision (YES) is obtained in step S2*a*, there is a possibility that liquid water freezes in the respective anode channels 4*a*A, 4*a*B of the FCs 4*a*, 4*b*; in this case, step S3-2 and step S3 are executed, so as to determine, with high accuracy, whether any of the unit cells 4*a*2 of the FC 4*a* is in a fuel deficiency state. When a negative decision (NO) is obtained in step S3, the FC 4*a* and the FC 4*b* are both unlikely to be in the fuel deficiency state, and step S3-1 is executed. In the cancellation process and advance process in the third modified example, the temperature elevation process as described above is employed.

In the third embodiment, step S5 is not executed after execution of step S4, unlike the embodiment shown in FIG. 3. This is because power generation has already been stopped in the FC 4*b* in the third embodiment. Thus, deciding not to start power generation of the FC 4*b*, even though an affirmative decision (YES) is obtained in step S1*a*, and the requests for start of power generation are generated to the FC 4*a* and the FC 4*b*, means "controlling power generation of the FC 4*b* to a stopped state".

When an affirmative decision (YES) is obtained in step S7, and the cancellation process performed on the FC 4*a* is stopped (step S8), the ECU 3 determines whether the temperature Tb1 detected by the temperature sensor Tb is higher than a threshold value Tγ (step S9*b*). The threshold value Tγ is 0° C., for example, but is not limited to this value, and may be a temperature slightly higher than 0° C. When a negative decision (NO) is obtained in step S9*b*, step S9*b* is executed again. When an affirmative decision (YES) is obtained in step S9*b*, ice in the anode channel 4*b*A of the FC 4*b* is assumed to be melted, and the advance process is stopped and power generation is started in the FC 4*b* (steps S9, S10). When an affirmative decision (YES) is obtained in step S9*b*, power generation may not be immediately started in the FC 4*b*, but may be started after a lapse of a predetermined time. This is because it may take some time for ice in the anode channel 4*b*A of the FC 4*b* to melt, after the temperature of the FC 4*b* becomes higher than 0° C. While the temperature sensor Tb that detects the temperature of the coolant of the FC 4*b* is used in step S9*b*, a temperature sensor that detects the temperature of the FC 4*b*, or its ambient temperature, may be used, for example.

When an affirmative decision (YES) is obtained in step S11, the ECU 3 stops the cancellation process and power generation in the FC 4*a* (steps S12, S13), and stops the advance process in to the FC 4*b* (step S14).

As described above, the FC 4*a* starts generating power first, only when affirmative decisions (YES) are obtained in step S2*a* and step S3, and both the FC 4*a* and the FC 4*b* start generating power, when a negative decision (NO) is obtained in at least one of step S2*a* and step S3. As a result, a difference in the accumulated power generation time between the FC 4*a* and the FC 4*b* can be reduced to a minimum, and chronological deterioration can be prevented from progressing due to increase in the accumulated power generation time of the FC 4*a* compared to that of the FC 4*b*.

The threshold value Tβ may be 10° C. This is because, when the outside air temperature is equal to or higher than 0° C. and lower than 10° C., moisture is likely to condense in the anode channels 4*a*A, 4*b*A of the FCs 4*a*, 4*b*, and fuel deficiency is likely to appear due to liquid water remaining in the channels. In this case, the drainage promotion process as described above is carried out as the cancellation process and the advance process. Also, step S9*b* and step S9 may not be executed in this case, and power generation of the FC 4*b* may be started when the outside temperature Tout obtained again is equal to or higher than the threshold value Tβ.

In the third modified example, the temperature Tout detected by the outside air temperature sensor 9 is used in step S2a, but the temperature used in step S2a is not limited to this. For example, the temperature detected by at least one of the temperature sensors Ta, Tb that detect the respective coolant temperatures of the FCs 4a, 4b may be used. Also, the temperature detected by a temperature sensor that directly detects the temperature of one of the FCs 4a, 4b, or a temperature sensor that detects its ambient temperature, may be used. These temperatures are all correlated with the outside air temperature, and thus, are examples of outside air temperature parameters.

When requests for start of power generation are generated to the FC 4a and the FC 4b, the ECU 3 may uniformly cause the FC 4a to start generating electric power, irrespective of the temperatures mentioned above, and may perform the cancellation process on the FC 4a and the advance process on the FC 4b when the minimum value Vamin is smaller than the threshold value. Generally, the temperature is lower while power generation is stopped in the fuel cell, than that during power generation, and condensed water is likely to be produced in the anode channel when power generation is started.

While the case where requests for start of power generation are generated to both the FC 4a and the FC 4b has been described in the third modified example, the ECU 3 may execute step S3 while placing the FC 4a in a power generation state, when a request for start of power generation is generated to at least one of the FC 4a and the FC 4b. For example, when a request for start of power generation is generated only to the FC 4a while power generation is stopped in both of the FCs 4a, 4b, the ECU 3 may cause the FC 4a to start generating electric power, and execute step S3. In this case, after the cancellation process and the advance process are performed, the ECU 3 need not start power generation in the FC 4b, as long as a request for power generation is generated to the FC 4b. When a request for start of power generation is generated only to the FC 4b while power generation is stopped in both of the FCs 4a, 4b, the ECU 3 may cause the FC 4a, rather than the FC 4b, to start generating power, while keeping the FC 4b in the power generation stopped state, and may execute step S3, for the reason as follows. Even if the ECU 3 causes the FC 4b to generate power, it cannot determine, with high accuracy, whether any of the unit cells 4b2 of the FC 4b is in a fuel deficiency state, by use of the voltage sensor Vb connected to the FC 4b. However, when the ECU 3 causes the FC 4a, rather than the FC 4b, to generate power, and executes step S3, it can determine, with high accuracy, whether any of the unit cells 4a2 of the FC 4a is in a fuel deficiency state, by referring to the detection result of the voltage sensor Va. When a request for start of power generation is generated to the FC 4a while the FC 4a is in a power generation stopped state and the FC 4b is in a power generating state, the ECU 3 may cause the FC 4a to start generating power, and execute step S3. In this case, when an affirmative decision (YES) is obtained in step S3, the ECU 3 may stop power generation in the FC 4b, and execute the advance process. When a request for start of power generation is generated to the FC 4b while the FC 4a is in a power generating state and the FC 4b is in a power generation stopped state, the ECU 3 may execute step S3 before starting power generation in the FC 4b. When an affirmative decision (YES) is obtained in step S3, the cancellation process may be performed, and the advance process may be performed on the FC 4b.

While the ECU 3 refers to the minimum value Vamin of the voltages detected by the voltage sensor Va, in steps S3, S7, and S11, the voltage referred to in these steps is not limited to this. For example, the ECU 3 may select one of the respective voltages of the unit cells 4a2 detected by the voltage sensor Va, which has the largest rate of reduction, and determine whether the largest value of the rate of reduction of the voltage is equal to or larger than a threshold value. Also, the ECU 3 may calculate the average value of voltage per unit cell, by dividing the total value of the respective voltages of the unit cells 4a2, by the number of the unit cells 4a2, and determine whether the maximum value of values obtained by subtracting each voltage of the unit cells 4a2 from the average value is equal to or larger than a threshold value. When an affirmative decision (YES) is obtained in the above determination, it indicates that the degree of reduction of the voltage of the unit cell in question is large, and the unit cell 4a2 is assumed to be in a fuel deficiency state. The above methods may be combined together. Also, the content of the cancellation process itself may be controlled, according to the magnitude of the above-indicated maximum value. For example, the cancellation process may be performed so as to increase energy consumed for cancelling the cause of the fuel deficiency state of the FC 4a as the maximum value is larger. For example, as the maximum value is larger, the valve-opening period of the INJ 26a or the rotating speed of the HP 29a may be increased, or the target temperature to which the temperature of the FC 4a is raised may be set to a higher level, so that ice in the anode channel 4aA is melted promptly, or a larger number of operations, out of the above operations (aa) to (ea), may be carried out at the same time.

First Modified Example of Voltage Sensors

Figure 7A:
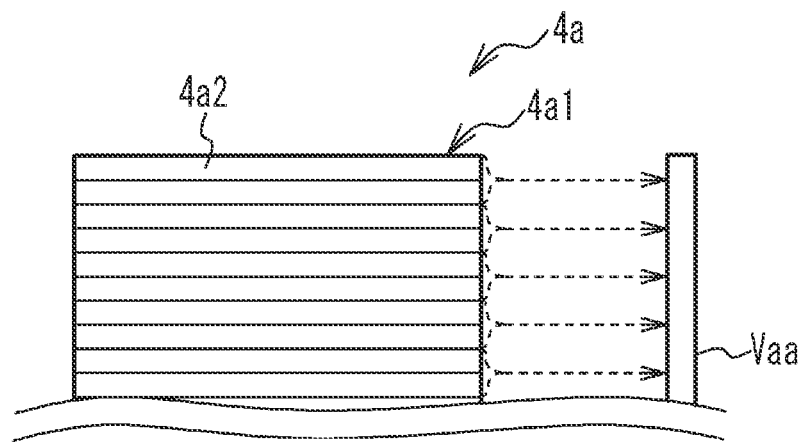
FIG. 7A is an explanatory view of a voltage sensor used in a first modified example.
Figure 7B:
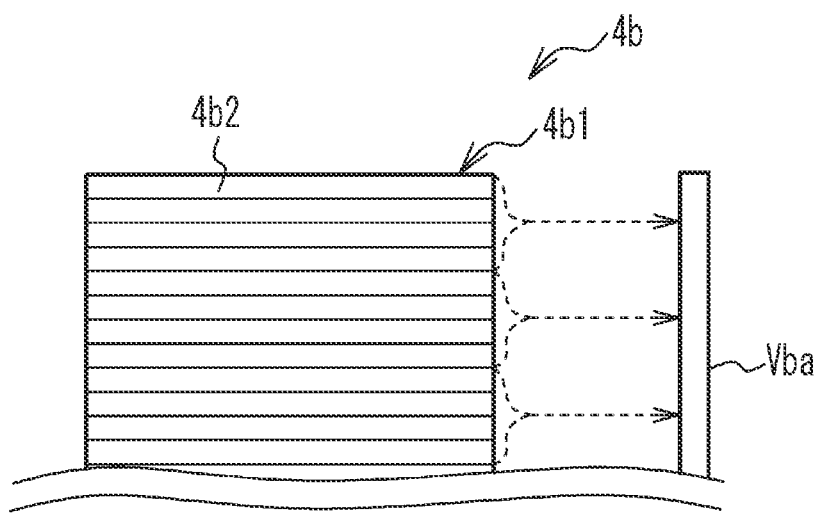
FIG. 7B is an explanatory view of another voltage sensor used in the first modified example.

FIG. 7A and FIG. 7B show a first modified example of voltage sensors. FIG. 7A shows a part of a voltage sensor Vaa, and FIG. 7B shows a part of a voltage sensor Vba. The voltage sensor Vaa detects a voltage for every two unit cells, with respect to all unit cells 4a2 of the FC 4a. Namely, the number of detection channels of the voltage sensor Vaa is one half of the total number of the stacked unit cells 4a2. On the other hand, the voltage sensor Vba detects a voltage for every four unit cells, with respect to all unit cells 4b2 of the FC 4b. Accordingly, the number of detection channels of the voltage sensor Vba is one-fourth of the total number of the stacked unit cells 4b2. In this case, too, the number of detection channels of the voltage sensor Vba is smaller than that of the voltage sensor Vaa, and thus, the manufacturing cost of the voltage sensor Vba is lower than that of the voltage sensor Vaa. Accordingly, the manufacturing cost is reduced, as compared with the case where a voltage sensor that detects a voltage for every two unit cells 4b2 is provided for the FC 4b, as in the FC 4a.

In steps S3, S7, and S11, the minimum value of the voltages detected by the voltage sensor Vaa may be used, or the voltage of each unit cell 4a2 may be calculated from the voltages detected by the voltage sensor Vaa, and the minimum value of the voltages of the respective unit cells 4a2 may be used.

While the voltage sensor Vaa detects the voltage of the unit cells 4a2 for every two unit cells, and the voltage sensor Vba detects the voltage of the unit cells 4b2 for every four unit cells, the manner of detecting voltage is not limited to this, but the voltage sensor Vaa may detect the voltage of the unit cells 4a2 for every "n" unit cells, and the voltage sensor Vba may detect the voltage of the unit cells 4b2 for every "m" unit cells, where "m" is larger than "n".

Second Modified Example of Voltage Sensors

Figure 8A:
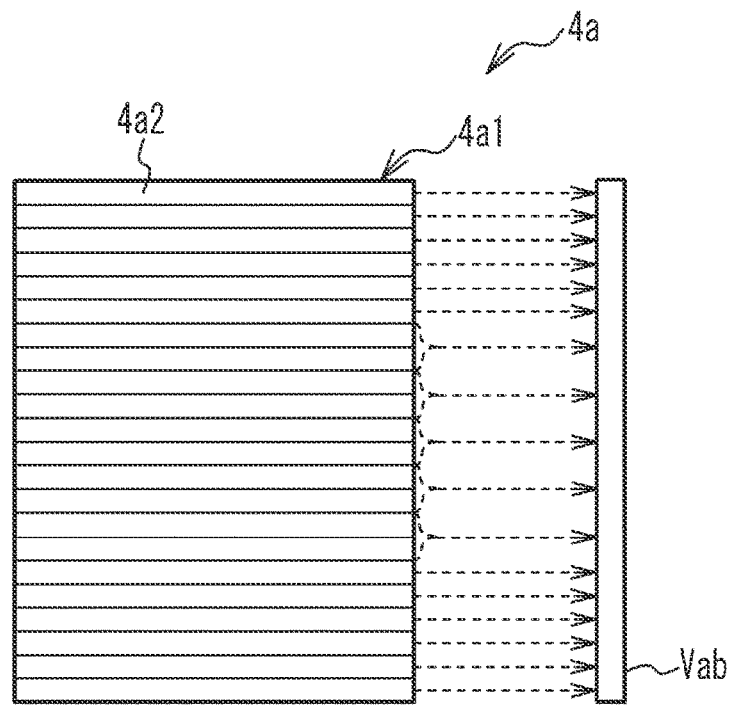
FIG. 8A is an explanatory view of a voltage sensor used in a second modified example.
Figure 8B:
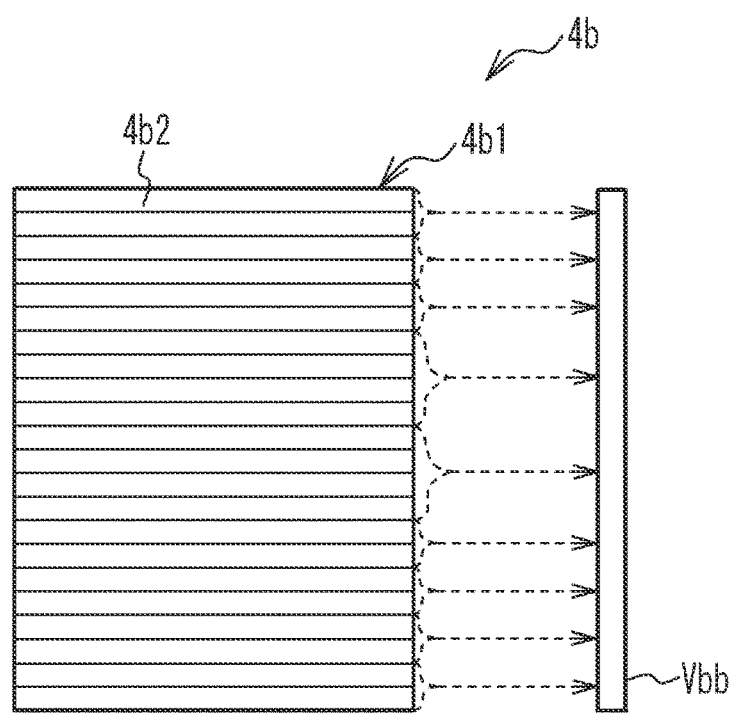
FIG. 8B is an explanatory view of another voltage sensor used in the second modified example.

FIG. 8A and FIG. 8B show a second modified example of voltage sensors. A voltage sensor Vab detects a voltage for each unit cell, with respect to a part of the unit cells 4a2, and detects a voltage for every two unit cells, with respect to another part of the unit cells 4a2. A voltage sensor Vbb detects a voltage for every two unit cells, with respect to a part of the unit cells 4b2, and detects a voltage for every four unit cells, with respect to another part of the unit cells 4b2. In this case too, the voltage sensor Vab may detect a voltage of the unit cells 4a2 for every "N" unit cells on average over the whole FC 4a, and the voltage sensor Vbb may detect a voltage of the whole FC 4b, or a voltage of the unit cells 4b2 for every "M" unit cells on average over the whole FC 4b, where "M" is larger than "N". In this case, the manufacturing cost of the voltage sensor Vbb is lower than that of the voltage sensor Vab.

In the above case, in steps S3, S7, and S11, a voltage of each unit cell 4a2 may be calculated from the detection result of the voltage sensor Vab, and the minimum value of the voltages thus calculated may be used. In step S5a of FIG. 4, the total value of the voltage values detected by the voltage sensor Vbb may be used as the voltage value Vb1, or the average value of voltages of the unit cells 4b2 per unit cell may be calculated from the detected voltages, and the average value may be used as the voltage value Vb1.

More specifically, the voltage sensor Vab detects a voltage for each unit cell, with respect to the unit cells 4a2 located in the vicinity of the opposite ends of the stack 4a1, and detects a voltage for every two unit cells, with respect to the unit cells 4a2 located in a middle portion of the stack 4a1. Similarly, the voltage sensor Vbb detects a voltage for every two unit cells, with respect to the unit cells 4b2 located in the vicinity of the opposite ends of the stack 4b1, and detects a voltage for every four unit cells, with respect to the unit cells 4b2 located in a middle portion of the stack 4b1. Here, the unit cells 4a2 located in the vicinity of the opposite ends of the stack 4a1 are more likely to be brought into a fuel deficiency state, than the unit cells 4a2 located in the middle portion of the stack 4a1. This is because the opposite end portions of the stack 4a1 are more likely to be cooled under an influence of the outside air temperature, than the middle portion, and condensed water is more likely to be produced or liquid water is more likely to freeze in the unit cells 4a2 in the vicinity of the opposite ends of the stack 4a1. Accordingly, in steps S3, S7, and S11, it is preferable to use the minimum value Vamin, out of the voltages of the unit cells 4a2 located in the vicinity of the opposite ends of the stack 4a1. Thus, reduction of the voltage can be detected with high accuracy, with respect to the unit cells 4a2 located in the vicinity of the opposite ends of the stack 4a1 where the unit cells 4a2 are likely to be placed in a fuel deficiency state and the voltage is likely to be reduced. Further, the manufacturing cost of the voltage sensor Vab can be reduced, as compared with the case where the voltage for each unit cell is detected with respect to all of the unit cells 4a2.

When the FC 4a includes 100 or more unit cells 4a2, for example, the voltage sensor Vab may detect a voltage for each unit cell, with respect to 20 unit cells 4a2 located at one end of the stack 4a1, and 20 unit cells 4a2 located at the other end, and detect a voltage for every two unit cells, with respect to the remaining unit cells 4a2 located in the middle portion of the stack 4a1. When the FC 4b includes 100 or more unit cells 4b2, for example, the voltage sensor Vbb may detect a voltage for every two unit cells, with respect to 20 unit cells 4b2 located at one end of the stack 4b1, and 20 unit cells 4b2 located at the other end, and detect a voltage for every four unit cells, with respect to the remaining unit cells 4b2 located in the middle portion of the stack 4b1.

In any case, the voltage sensor connected to the FC 4a may detect voltage of the unit cells 4a2 for every "N" unit cells on average over the whole FC 4a, and the voltage sensor connected to the FC 4b may detect voltage of the whole FC 4b, or voltage of the unit cells 4b2 for every "M" unit cells on average over the whole FC 4b, where "M" is larger than "N".

The above-mentioned "N" unit cells on average can be calculated by dividing the total number of the stacked unit cells 4a2, by the number of detection channels of the voltage sensor connected to the FC 4a. Suppose the total number of the stacked unit cells 4a2 of the FC 4a is 100, and the voltage is detected for each unit cell with respect to 20 unit cells 4a2 at one end of the stack 4a1 and 20 unit cells 4a2 at the other end, while the voltage is detected for every two unit cells with respect to the remaining 60 unit cells 4a2. Since the total number of stacked unit cells is 100, and the number of detection channels is 70, the average "N" is calculated as follows: 100÷70≈1.4. In this case, the voltage sensor connected to the FC 4a detects the voltage of the unit cells 4a2 for approximately every 1.4 unit cells on average.

Similarly, the "M" unit cells on average can be calculated by dividing the total number of the stacked unit cells 4b2, by the number of detection channels of the voltage sensor Vb connected to the FC 4b. Suppose the total number of the stacked unit cells 4b2 of the FC 4b is 100, and the voltage is detected for every two unit cells with respect to 20 unit cells 4b2 at one end of the stack 4b1 and 20 unit cells 4b2 at the other end, while the voltage is detected for every four unit cells with respect to the remaining 60 unit cells 4b2. Since the total number of stacked unit cells is 100, and the number of detection channels is 35, the average "M" is calculated as follows: 100÷35≈2.9. In this case, the voltage sensor connected to the FC 4b detects the voltage of the unit cells 4b2 for approximately every 2.9 unit cells on average.

In the case where the total number of the stacked unit cells 4a2 of the FC 4a is smaller than the total number of the stacked unit cells 4b2, the number of detection channels of the voltage sensor connected to the FC 4a may be smaller than that of the voltage sensor connected to the FC 4b, even when the voltage sensor connected to the FC 4a detects the voltage of the unit cells 4a2 for every "N" unit cells on average, and the voltage sensor connected to the FC 4b detects the voltage of the unit cells 4b2 for every "M" unit cells on average. However, in this case, too, the manufacturing cost of the voltage sensor connected to the FC 4b, for each unit cell 4b2, is lower than that of the voltage sensor when it is connected to the FC 4b to detect the voltage for every "N" unit cells of the unit cells 4b2 on average. Thus, the manufacturing cost of the fuel cell system can be reduced, by using the voltage sensor connected to the FC 4b.

While the fuel cell system includes two fuel cells, i.e., the FC 4a and the FC 4b, in the illustrated embodiment and modified examples, the fuel cell system may include three or more fuel cells. In the fuel cell system including three or more fuel cells, the ECU may refer to the detection result of a selected one of voltage sensors respectively connected to the fuel cells, which one detects voltage of unit cells for each set of the minimum number of unit cells, and performs the cancellation process on the fuel cell to which the selected voltage sensor is connected, while stopping power generation in the other fuel cells.

While the fuel cell system as described above is installed on the vehicle, the fuel cell system is not limited to this type, but may be of a stationary type. Also, the vehicle is not limited to an automobile, but may be a two-wheel vehicle, rail vehicle, ship, aircraft, or the like.

While the preferred embodiments of the disclosure have been described in detail, the disclosure is not limited to the particular embodiments, but may be embodied with various modifications or changes, within the range of the principle of the disclosure defined in the appended claims.

What is claimed is:

1. A fuel cell system comprising:
a first fuel cell to which a fuel gas and an oxidant gas are supplied, the first fuel cell including a plurality of first unit cells stacked together;
a second fuel cell to which a fuel gas and an oxidant gas are supplied, the second fuel cell including a plurality of second unit cells stacked together;
a first voltage detector connected to the first fuel cell;
a second voltage detector connected to the second fuel cell; and
a controller programmed to control operation of the first fuel cell and the second fuel cell, wherein
the first voltage detector is configured to detect voltage of the first unit cells for every "N" unit cells on average,
the second voltage detector is configured to detect voltage of the second fuel cell as a whole, or detect voltage of the second unit cells for every "M" unit cells on average, where "M" represents a number that is larger than "N", and
the controller is programmed to perform a determining process to determine whether any of the first unit cells is in a fuel deficiency state, by referring to a detection result of the first voltage detector, the controller being programmed to perform a cancellation process to cancel the fuel deficiency state, on the first fuel cell that is in a power generating state, and control power generation of the second fuel cell to a stopped state, when an affirmative decision is obtained in the determining process.

2. The fuel cell system according to claim 1, wherein the controller is programmed to perform the cancellation process that is being performed on the first fuel cell, while referring to the detection result of the first voltage detector.

3. The fuel cell system according to claim 1, wherein the controller is programmed to determine whether the fuel deficiency state has been cancelled in all of the first unit cells through execution of the cancellation process, by referring to the detection result of the first voltage detector.

4. The fuel cell system according to claim 3, wherein the controller is programmed to stop the cancellation process, when the controller determines that the fuel deficiency state has been cancelled in all of the first unit cells through execution of the cancellation process.

5. The fuel cell system according to claim 3, wherein the controller is programmed to control power generation of the first fuel cell to the stopped state, when the controller does not determine that the fuel deficiency state has been cancelled in all of the first unit cells through execution of the cancellation process.

6. The fuel cell system according to claim 1, wherein, the controller is programmed to, when the controller determines that any of the first unit cells is in the fuel deficiency state, perform the cancellation process on the first fuel cell, control power generation of the second fuel cell to the stopped state, and further perform an advance process to cancel a cause of the fuel deficiency state, on the second fuel cell, before start of power generation of the second fuel cell.

7. The fuel cell system according to claim 1, wherein, the controller is programmed to, when the controller determines that any of the first unit cells is in the fuel deficiency state, and a voltage parameter correlated with the voltage of the second fuel cell indicates that the voltage of the second fuel cell that is in the power generating state is lower than a threshold value, perform the cancellation process on the first fuel cell, and control power generation of the second fuel cell to the stopped state.

8. The fuel cell system according to claim 1, wherein, the controller is programmed to, when the controller determines that any of the first unit cells is in the fuel deficiency state, and a temperature parameter correlated with a temperature of the second fuel cell indicates that the temperature of the second fuel cell that is in the power generating state is equal to or lower than a threshold value, perform the cancellation process on the first fuel cell, and control power generation of the second fuel cell to the stopped state.

9. The fuel cell system according to claim 1, wherein, the controller is programmed to, when a request for start of power generation is generated to at least one of the first fuel cell and the second fuel cell, perform the determining process on the first fuel cell that is in the power generating state.

10. The fuel cell system according to claim 1, wherein, the controller is programmed to, when a request for start of power generation is generated to at least one of the first fuel cell and the second fuel cell, and an outside air temperature parameter correlated with an outside air temperature indicates that the outside air temperature is equal to or lower than a threshold value, perform the determining process on the first fuel cell that is in the power generating state.

11. The fuel cell system according to claim 1, wherein, the controller is programmed to, when the controller determines that any of the first unit cells is in the fuel deficiency state, and a total required output of the first fuel cell and the second fuel cell is smaller than a threshold value, perform the cancellation process on the first fuel cell, and control power generation of the second fuel cell to the stopped state.

* * * * *